United States Patent
Furihata et al.

(10) Patent No.: US 7,912,304 B2
(45) Date of Patent: Mar. 22, 2011

(54) IMAGE PROCESSING CIRCUIT, AND DISPLAY PANEL DRIVER AND DISPLAY DEVICE MOUNTING THE CIRCUIT

(75) Inventors: Hirobumi Furihata, Kanagawa (JP); Takashi Nose, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 83 days.

(21) Appl. No.: 12/457,941

(22) Filed: Jun. 25, 2009

(65) Prior Publication Data

US 2009/0322713 A1    Dec. 31, 2009

(30) Foreign Application Priority Data

Jun. 30, 2008 (JP) ................................. 2008-171364

(51) Int. Cl.
*G06K 9/46* (2006.01)
*G09G 5/00* (2006.01)
*G06T 9/00* (2006.01)
(52) U.S. Cl. .................... 382/244; 345/204; 345/555
(58) Field of Classification Search .......... 382/232–253, 382/100; 358/1.1–1.18; 345/204, 555
See application file for complete search history.

(56) References Cited

U.S. PATENT DOCUMENTS

| | | |
|---|---|---|
| 6,314,209 B1 | 11/2001 | Kweon et al. |
| 6,633,668 B1 | 10/2003 | Newman |
| 6,972,868 B1 | 12/2005 | Gondek et al. |
| 7,483,574 B2 | 1/2009 | Sasaki |
| 7,570,819 B2 * | 8/2009 | Sung et al. ................... 382/232 |
| 7,612,911 B2 | 11/2009 | Kakutani |

(Continued)

FOREIGN PATENT DOCUMENTS

JP    6-46269    2/1994

(Continued)

OTHER PUBLICATIONS

Japanese Office Action dated Nov. 11, 2009 and partial English translation thereof.

(Continued)

*Primary Examiner* — Samir A Ahmed
*Assistant Examiner* — Mehdi Rashidian
(74) *Attorney, Agent, or Firm* — McGinn IP Law Group, PLLC

(57) ABSTRACT

A display panel driver includes: a compression circuit, when receiving image data of N×M pixels of a target block, generating compressed image data corresponding to the target block by compressing the image data; an image memory storing the compressed image data; a decompression circuit generating decompressed image data by decompressing the compressed image data from the image memory; and a drive circuit driving a display panel in response to the decompressed image data. The compression circuit selects one of a plurality of compression methods based on a correlation between the image data of the N×M pixels, and generates the compressed image data by the selected compression method. The plurality of compression methods includes: a first method calculating a first value corresponding to image data of the N×M pixels and putting the first value in the compressed image data, a second method calculating a second value corresponding to image data of n pixels of the N×M pixels and putting the second value in the compressed image data, and a third method calculating a bit plane reducing data by performing a bit plane reduction process independently on image data of each of the N×M pixels and putting the bit plane reducing data in the compressed image data.

12 Claims, 24 Drawing Sheets

U.S. PATENT DOCUMENTS

2004/0022444 A1* 2/2004 Rhoads ......................... 382/232
2006/0181720 A1 8/2006 Kakutani
2006/0220984 A1 10/2006 Miyasaka
2007/0269118 A1 11/2007 Sasaki et al.

FOREIGN PATENT DOCUMENTS

| | | |
|---|---|---|
| JP | 8-202881 | 8/1996 |
| JP | 10-66072 | 3/1998 |
| JP | 10-79944 | 3/1998 |
| JP | 11-27664 | 1/1999 |
| JP | 2001-103331 | 4/2001 |
| JP | 2002-237954 | 8/2002 |
| JP | 2003-162272 | 6/2003 |
| JP | 2003-209699 | 7/2003 |
| JP | 2004-289274 | 10/2004 |
| JP | 2006-311474 | 11/2006 |
| JP | 2007-312126 | 11/2007 |

OTHER PUBLICATIONS

Japanese Office Action dated Feb. 18, 2010, with English translation.
Japanese Office Action dated Jan. 4, 2010, with English translation.

* cited by examiner

Fig. 6A (1×4) PIXEL COMPRESSION

| | R | G | B |
|---|---|---|---|
| A | 50 | 1 | 30 |
| B | 51 | 100 | 39 |
| C | 4 | 4 | 100 |
| D | 100 | 1 | 2 |

| α |
|---|
| 0 |
| 5 |
| 10 |
| 15 |

ADDING ERROR DATA α

| PIXEL | R | G | B |
|---|---|---|---|
| A | 50 | 1 | 30 |
| B | 56 | 105 | 44 |
| C | 14 | 14 | 110 |
| D | 115 | 16 | 17 |

PERFORMING ROUNDING PROCESS AND BIT ROUND-DOWN PROCESS

| | R | G | B |
|---|---|---|---|
| A | 3 | 0 | 2 |
| B | 4 | 7 | 3 |
| C | 1 | 1 | 7 |
| D | 7 | 1 | 1 |

Fig. 6B

(1×4) PIXEL DECOMPRESSION

| PIXEL | R | G | B |
|---|---|---|---|
| A | 3 | 0 | 2 |
| B | 4 | 7 | 3 |
| C | 1 | 1 | 7 |
| D | 7 | 1 | 1 |

↓ PERFORMING BIT ROUND-UP PROCESS

| PIXEL | R | G | B |
|---|---|---|---|
| A | 48 | 0 | 32 |
| B | 64 | 112 | 48 |
| C | 16 | 16 | 112 |
| D | 112 | 16 | 32 |

↓ SUBTRACTING ERROR DATA $\alpha$

| | R | G | B |
|---|---|---|---|
| A | 48 | 0 | 32 |
| B | 59 | 107 | 43 |
| C | 6 | 6 | 102 |
| D | 97 | 1 | 17 |

Fig. 7

| COMPRESSION TYPE RECOGNITION BIT (1 bit) | $R_A$ DATA (4 bits) | $G_A$ DATA (4 bits) | $B_A$ DATA (4 bits) | $R_B$ DATA (4 bits) | $G_B$ DATA (4 bits) | $B_B$ DATA (4 bits) |
|---|---|---|---|---|---|---|

| $R_C$ DATA (4 bits) | $G_C$ DATA (4 bits) | $B_C$ DATA (4 bits) | $R_D$ DATA (4 bits) | $G_D$ DATA (4 bits) | $B_D$ DATA (3 bits) |
|---|---|---|---|---|---|

| COMPRESSION TYPE RECOGNITION BIT (2 bits) | FORM RECOGNITION DATA (3 bits) | R REPRESENTATIVE VALUE (5 or 6 bits) | G REPRESENTATIVE VALUE (5 or 6 bits) | B REPRESENTATIVE VALUE (5 bits) | LARGE-SMALL RECOGNITION DATA (1 bit × 0~2) | β COMPARISON RESULT DATA (1 bit×2) |
|---|---|---|---|---|---|---|

IMAGE DATA OF TWO PIXELS WITH HIGH CORRELATION

| Ri DATA (4 bits) | Gi DATA (4 bits) | Bi DATA (4 bits) | Rj DATA (4 bits) | Gj DATA (4 bits) | Bj DATA (4 bits) |
|---|---|---|---|---|---|

IMAGE DATA OF TWO PIXELS WITH LOW CORRELATION

Fig. 9B

| COMPRESSION TYPE RECOGNITION BIT (2 bits) | FORM RECOGNITION DATA (2 bits) | R REPRESENTATIVE VALUE (5 or 6 bits) | G REPRESENTATIVE VALUE (6 or 7 bits) | B REPRESENTATIVE VALUE (5 bits) | LARGE-SMALL RECOGNITION DATA (1 bit × 0~2) | β COMPARISON RESULT DATA (1 bit × 2) |
|---|---|---|---|---|---|---|

IMAGE DATA OF TWO PIXELS WITH HIGH CORRELATION

| Ri DATA (4 bits) | Gi DATA (4 bits) | Bi DATA (4 bits) | Rj DATA (4 bits) | Gj DATA (4 bits) | Bj DATA (4 bits) |
|---|---|---|---|---|---|

IMAGE DATA OF TWO PIXELS WITH LOW CORRELATION

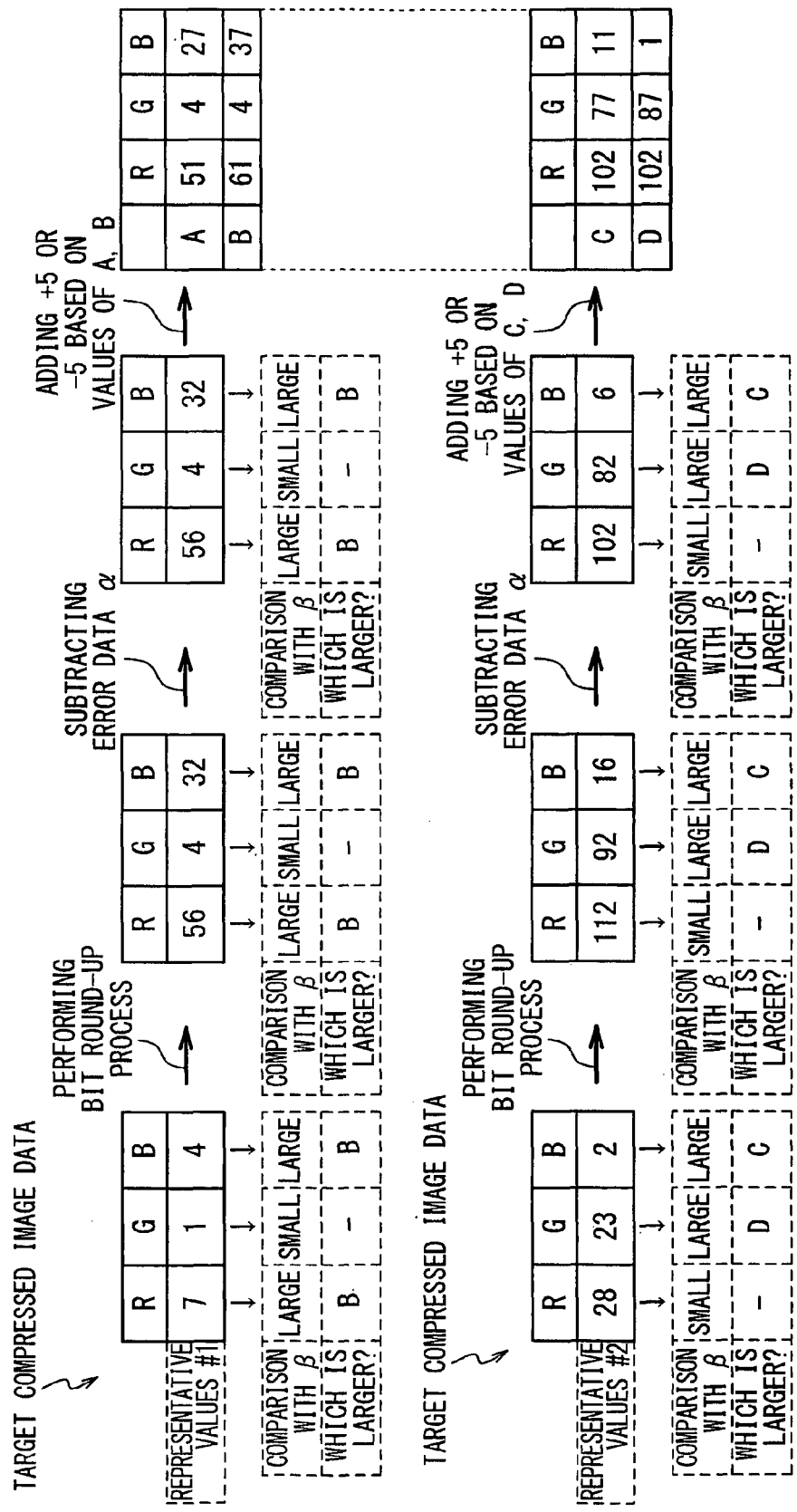

Fig. 11A

| COMPRESSION TYPE RECOGNITION BIT (3 bits) | FORM RECOGNITION DATA (2 bits) | DATA OF TWO PIXELS {R REPRESENTATIVE VALUE #1 (5 or 6 bits) | G REPRESENTATIVE VALUE #1 (5 or 6 bits) | B REPRESENTATIVE VALUE #1 (5 or 6 bits)} | DATA OF TWO PIXELS {R REPRESENTATIVE VALUE #2 (5 or 6 bits) | G REPRESENTATIVE VALUE #2 (6 or 7 bits) | B REPRESENTATIVE VALUE #2 (5 or 6 bits)} | LARGE-SMALL RECOGNITION DATA (1 bit × 0~6) | β COMPARISON RESULT DATA (1 bit × 6) |
|---|---|---|---|---|---|---|---|---|---|

Fig. 11B

| COMPRESSION TYPE RECOGNITION BIT (3 bits) | FORM RECOGNITION DATA (1 bit) | R REPRESENTATIVE VALUE #1 (5 or 6 bits) | G REPRESENTATIVE VALUE #1 (6 or 7 bits) | B REPRESENTATIVE VALUE #1 (5 or 6 bits) | R REPRESENTATIVE VALUE #2 (5 or 6 bits) | G REPRESENTATIVE VALUE #2 (6 or 7 bits) | B REPRESENTATIVE VALUE #2 (5 or 6 bits) | LARGE-SMALL RECOGNITION DATA (1 bit × 0~6) | β COMPARISON RESULT DATA (1 bit × 6) |
|---|---|---|---|---|---|---|---|---|---|
| | | DATA OF TWO PIXELS | | | DATA OF TWO PIXELS | | | | |

Fig. 12A (4×1) PIXEL COMPRESSION

TARGET IMAGE DATA

| | R | G | B |
|---|---|---|---|
| A | 10 | 12 | 14 |
| B | 6 | 7 | 8 |
| C | 5 | 4 | 3 |
| D | 0 | 1 | 2 |

EXECUTING MATRIX OPERATION →

| | Y | Cb | Cr |
|---|---|---|---|
| A | 48 | 2 | −2 |
| B | 28 | 1 | −1 |
| C | 16 | −1 | 1 |
| D | 4 | 1 | −1 |

→ EXECUTING OPERATION FOR Ymin, Ydist0, Ydist1, Ydist2, Cb', Cr'

Fig. 13

| COMPRESSION TYPE RECOGNITION BIT (4 bits) | Ymin (10 bits) | Ydist0 (4 bits) | Ydist1 (4 bits) | Ydist2 (4 bits) | ADDRESS DATA (2 bits) | Cb' (10 bits) | Cr' (10 bits) |
|---|---|---|---|---|---|---|---|

Fig. 14

|  | X1X0 | | | |
|---|---|---|---|---|
|  | 00 | 01 | 10 | 11 |
| Y1Y0 00 | 15 | 05 | 01 | 11 |
| 01 | 00 | 10 | 14 | 04 |
| 10 | 07 | 09 | 13 | 02 |
| 11 | 08 | 06 | 03 | 12 |

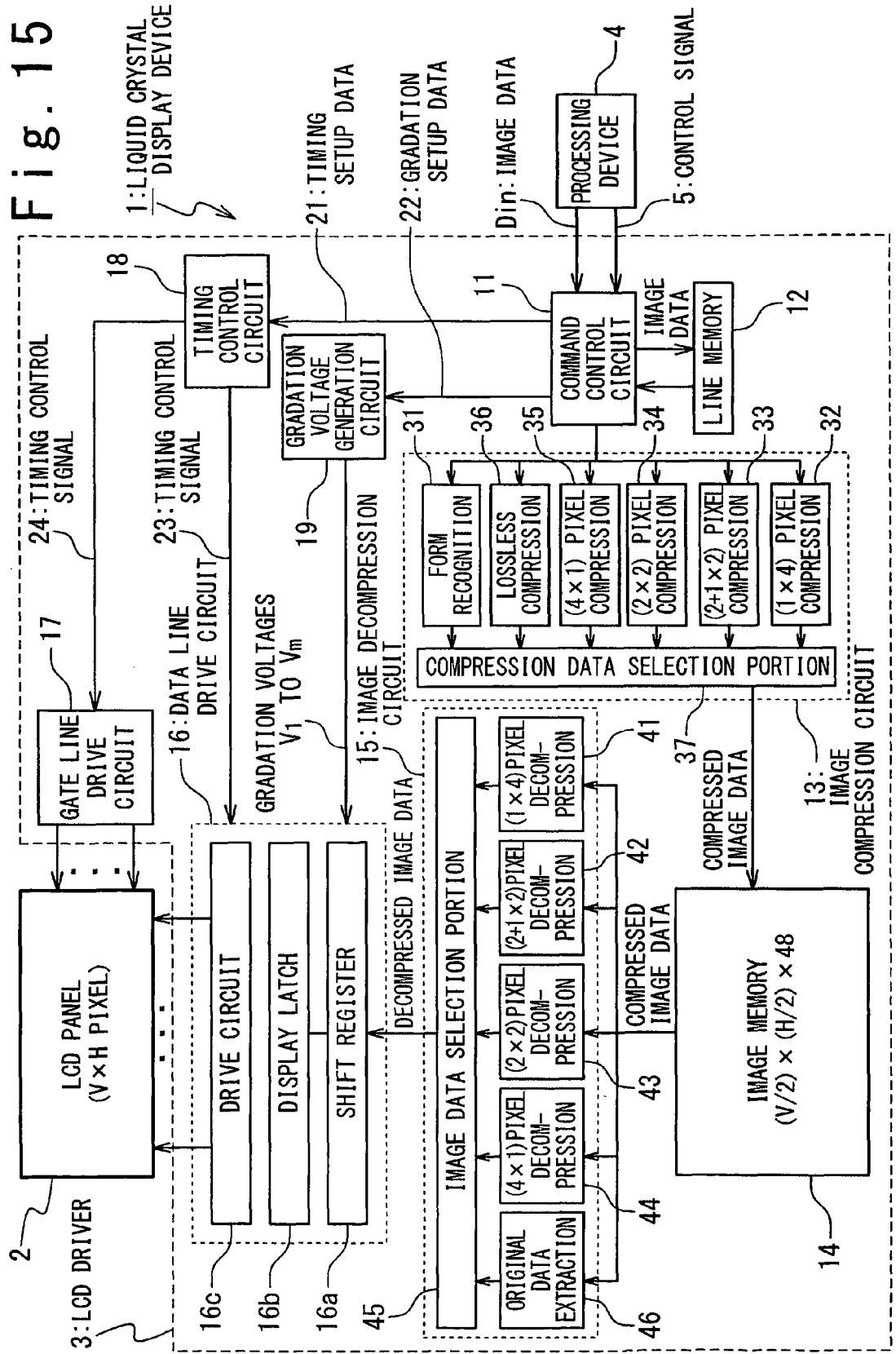

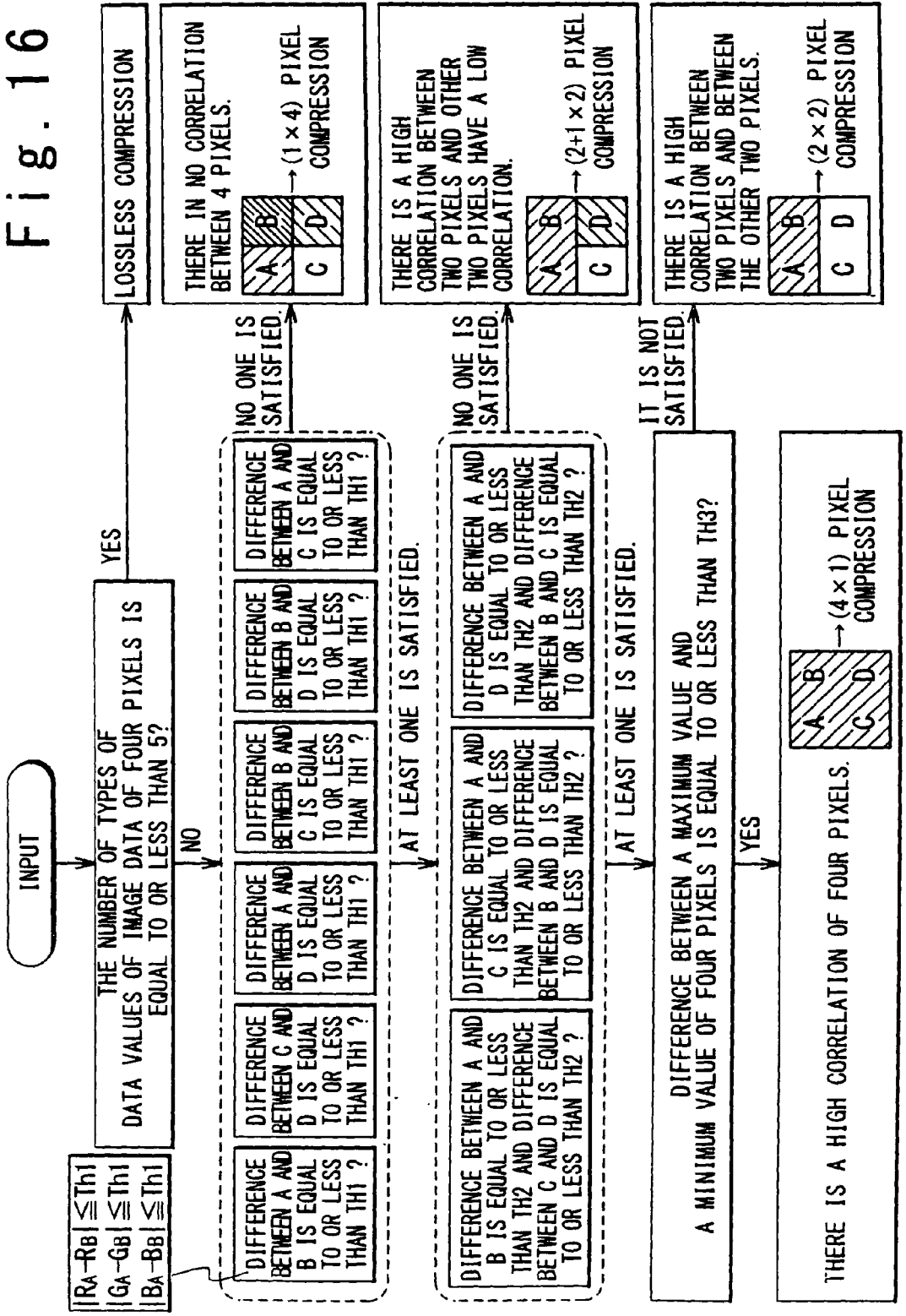

Fig. 17A

|   | R  | G | B  |
|---|----|---|----|
| A | 10 | 5 | 15 |
| B | 10 | 5 | 15 |
| C | 10 | 5 | 15 |
| D | 10 | 5 | 15 |

Fig. 17B

|   | R   | G   | B   |
|---|-----|-----|-----|
| A | 50  | 50  | 50  |
| B | 200 | 200 | 200 |
| C | 100 | 100 | 100 |
| D | 10  | 10  | 10  |

Fig. 17C

|   | R   | G | B |
|---|-----|---|---|
| A | 50  | 5 | 5 |
| B | 200 | 5 | 5 |
| C | 100 | 5 | 5 |
| D | 10  | 5 | 5 |

Fig. 17D

|   | R | G   | B |
|---|---|-----|---|
| A | 5 | 5   | 5 |
| B | 5 | 200 | 5 |
| C | 5 | 100 | 5 |
| D | 5 | 10  | 5 |

Fig. 17E

|   | R | G | B   |
|---|---|---|-----|
| A | 5 | 5 | 50  |
| B | 5 | 5 | 200 |
| C | 5 | 5 | 100 |
| D | 5 | 5 | 10  |

Fig. 17F

|   | R   | G | B   |
|---|-----|---|-----|
| A | 50  | 5 | 50  |
| B | 200 | 5 | 200 |
| C | 100 | 5 | 100 |
| D | 10  | 5 | 10  |

Fig. 17G

|   | R   | G   | B |
|---|-----|-----|---|
| A | 50  | 50  | 5 |
| B | 200 | 200 | 5 |
| C | 100 | 100 | 5 |
| D | 10  | 10  | 5 |

Fig. 17H

|   | R | G   | B   |
|---|---|-----|-----|
| A | 5 | 5   | 5   |
| B | 5 | 200 | 200 |
| C | 5 | 100 | 100 |
| D | 5 | 10  | 10  |

Fig. 18

| COMPRESSION TYPE RECOGNITION BIT (4 bits) | COLOR TYPE DATA (3 bits) | IMAGE DATA #1 (8 bits) | IMAGE DATA #2 (8 bits) | IMAGE DATA #3 (8 bits) | IMAGE DATA #4 (8 bits) | IMAGE DATA #5 (8 bits) | PADDING DATA (1 bit) |

IMAGE PROCESSING CIRCUIT, AND DISPLAY PANEL DRIVER AND DISPLAY DEVICE MOUNTING THE CIRCUIT

INCORPORATED BY REFERENCE

This application is based upon and claims the benefit of priority from Japanese patent application No. 2008-171364 filed on Jun. 30, 2008, the disclosure of which is incorporated herein in its entirety by reference.

BACKGROUND OF THE INVENTION

1. Field of the Invention

The present invention relates to an image processing circuit, and a display panel driver and display device mounting the image processing circuit.

2. Description of Related Art

In a mobile apparatus such as a mobile phone and a PDA (Personal Digital Assistant), an LCD (Liquid Crystal Display) panel or another display panel is generally mounted. Since the mobile apparatus relies on a battery for a power supply, it is important to reduce power consumption of a display panel and a display panel driver for driving the display panel (for example, an LCD driver), resulting in extension of an operating time.

One method for reducing power consumption is to mount an image memory on the display panel driver and reduce the frequency of access to the image memory. For example, if image data is written to the image memory only in a case where an image is changed, an electric power required for transfer of image data is reduced and accordingly the power consumption can be reduced.

One problem about the mounting of the image memory on the display panel driver is increase in a required memory capacity. In these years, resolution and the number of gradations of the display panel are increasing because of diversification of contents to be displayed. For this reason, increase in a capacity of the image memory is demanded. However, since leading to increase in a cost, the increase in the capacity of the image memory is not favorable.

One method for reducing the memory capacity is to compress image data and store the compressed data in the image memory. Various types of compression methods of image data stored in the image memory are proposed.

One commonly-known compression method is block coding for performing a compression process in units of blocks including a plurality of pixels. In the block coding, image data of a plurality of pixels constituting the block is represented by at least one representative value. For example, Japanese Laid-Open Patent Application JP-P 2007-312126A (US2007269118 (A1)) discloses a compression method for representing image dada of pixels in a block by a plurality of representative value. In the compression method described in this publication, one of three-level BTC (Block Truncation Coding) and two-level BTC is selected depending on image data, and compression of the image data is performed by the selected coding technique. Specifically, RGB data is converted into YUV data, and the three-level BTC is employed in a case where a difference in brightness data of pixels and a difference of color difference data are large in each block. In a case where the differences are not so large, the two-level BTC is employed. In addition, Japanese Laid-Open Patent Application JP-A-Heisei 10-66072 discloses a compression method for constituting compressed image data by using an average value, a deviation, and a piece of bit plane information of image data in pixels of a block.

One problem of the block coding is block noise caused by a difference of correlation between adjacent blocks. For example, when a compression process is performed in units of blocks each including 4 pixels, a case will be considered in which: a correlation of image data among 4 pixels in a certain block is high; and a correlation of image data among 4 pixels in an adjacent block is low. In this case, a large error exists in the block with low correlation, and the block with a large error is arranged next to the block with a small error. Human eyes will recognize this as block noise.

Another commonly-known compression method is a method for independently processing image data of each pixel such as the dither processing using a dither matrix. Such compression method is disclosed in, for example, Japanese Laid-Open Patent Application JP-P 2003-162272A (U.S. Pat. No. 7,483,574 (B2)). In the compression method for independently processing image data of each pixel, block noise is not generated. However, in the compression method for independently processing image data of each pixel, there is a problem that generates granular noise in an image in which pixels with high correlation of image data are arranged.

Japanese Laid-Open Patent Application JP-P 2006-311474A (US2006220984 (A1)) discloses a technique that: uses the block coding for an image with moderate gradation; and independently processes image data of each pixel when gradations of adjacent pixels are widely different from each other. This publication describes that the two functions are necessary to perform the image processing for any images without collapse.

However, the inventors have now discovered the following facts. According to study by the inventors, the compression method disclosed in Japanese Laid-Open Patent Application JP-P 2006-311474A does not substantially reduce granular noise. When even one pixel having low correlation of image data to other pixels exists in pixels included in a block, the technique disclosed in Japanese Laid-Open Patent Application JP-P 2006-311474A employs a compression method for independently processing image data of each pixel. For example, in a case where the block includes pixels arranged in 2 rows by 2 columns, even when a correlation of image data between two pixels is high and a correlation of image data of remaining two pixels with the former two pixels is low, a compression method for independently processing image data of each pixel is employed. In this case, the compression method for independently processing image data of each pixel is employed for the pixel with a high correlation of image data, resulting in generation of granular noise.

SUMMARY

The present invention seeks to solve one or more of the above problems, or to improve upon those problems at least in part.

In one embodiment, a display panel driver includes: a compression circuit configured to, when receiving image data of N×M (N and M is integer, N×M≧4) pixels of a target block, generate compressed image data corresponding to the target block by compressing the image data; an image memory configured to store the compressed image data; a decompression circuit configured to generate decompressed image data by decompressing the compressed image data reading from the image memory; and a drive circuit configured to drive a display panel in response to the decompressed image data. The compression circuit selects one of a plurality of compression methods based on a correlation between the image data of the N×M pixels of the target block, and generates the compressed image data by using the selected compression method. The plurality of compression methods includes: a first compression method which calculates a first representative value corresponding to image data of the N×M pixels and puts the first representative value in the compressed image data, a second compression method which calculates a second representative value corresponding to image data of n ($2 \leq n < N \times M$) pixels of the N×M pixels and puts the second representative value in the compressed image data, and a third compression method which calculates a first bit plane reducing data by performing a bit plane reduction process independently on image data of each of the N×M pixels and puts the first bit plane reducing data in the compressed image data.

In another embodiment, a display device includes: a display panel; and a display panel driver configured to drive the display panel. The display panel driver includes: a compression circuit configured to, when receiving image data of N×M (N and M is integer, $N \times M \geq 4$) pixels of a target block, generate compressed image data corresponding to the target block by compressing the image data, an image memory configured to store the compressed image data, a decompression circuit configured to generate decompressed image data by decompressing the compressed image data reading from the image memory, and a drive circuit configured to drive a display panel in response to the decompressed image data. The compression circuit selects one of a plurality of compression methods based on a correlation between the image data of the N×M pixels of the target block, and generates the compressed image data by using the selected compression method. The plurality of compression methods includes: a first compression method which calculates a first representative value corresponding to image data of the N×M pixels and puts the first representative value in the compressed image data, a second compression method which calculates a second representative value corresponding to image data of n ($2 \leq n < N \times M$) pixels of the N×M pixels and puts the second representative value in the compressed image data, and a third compression method which calculates a first bit plane reducing data by performing a bit plane reduction process independently on image data of each of the N×M pixels and puts the first bit plane reducing data in the compressed image data.

In another embodiment, an image processing circuit includes: a compression circuit configured to, when receiving image data of N×M (N and M is integer, $N \times M \geq 4$) pixels of a target block, generate compressed image data corresponding to the target block by compressing the image data. The compression circuit selects one of a plurality of compression methods based on a correlation between the image data of the N×M pixels of the target block, and generates the compressed image data by using the selected compression method. The plurality of compression methods includes: a first compression method which calculates a first representative value corresponding to image data of the N×M pixels and puts the first representative value in the compressed image data, a second compression method which calculates a second representative value corresponding to image data of n ($2 \leq n < N \times M$) pixels of the N×M pixels and puts the second representative value in the compressed image data, and a third compression method which calculates a first bit plane reducing data by performing a bit plane reduction process independently on image data of each of the N×M pixels and puts the first bit plane reducing data in the compressed image data.

In another embodiment, a display panel driver includes: a compression circuit configured to, when receiving image data of a plurality of pixels of a target block, generate compressed image data corresponding to the target block by compressing the image data; an image memory configured to store the compressed image data; a decompression circuit configured to generate decompressed image data by decompressing the compressed image data reading from the image memory; and a drive circuit configured to drive a display panel in response to the decompressed image data. The compression circuit selects one of a plurality of compression methods based on a correlation between the image data of the plurality of pixels of the target block, and generates the compressed image data by using the selected compression method. The number of bits of the compressed image data is constant regardless of the plurality of compression method. The compressed image data includes a compression type recognition bit indicating a type of the selected compression method. The number of bits of the compression type recognition bit of the compressed image data becomes low, when the correlation between the image data of the plurality of pixels becomes high.

In another embodiment, a display device includes: a display panel; and a display panel driver configured to drive the display panel. The display panel driver includes: a compression circuit configured to, when receiving image data of a plurality of pixels of a target block, generate compressed image data corresponding to the target block by compressing the image data, an image memory configured to store the compressed image data, a decompression circuit configured to generate decompressed image data by decompressing the compressed image data reading from the image memory, and a drive circuit configured to drive a display panel in response to the decompressed image data. The compression circuit selects one of a plurality of compression methods based on a correlation between the image data of the plurality of pixels of the target block, and generates the compressed image data by using the selected compression method. The number of bits of the compressed image data is constant regardless of the plurality of compression method. The compressed image data includes a compression type recognition bit indicating a type of the selected compression method. The number of bits of the compression type recognition bit of the compressed image data becomes low, when the correlation between the image data of the plurality of pixels becomes high.

In another embodiment, an image processing circuit includes: a compression circuit configured to, when receiving image data of a plurality of pixels of a target block, generate compressed image data corresponding to the target block by compressing the image data. The compression circuit selects one of a plurality of compression methods based on a correlation between the image data of the plurality of pixels of the target block, and generates the compressed image data by using the selected compression method. The number of bits of the compressed image data is constant regardless of the plurality of compression method. The compressed image data includes a compression type recognition bit indicating a type of the selected compression method. The number of bits of the compression type recognition bit of the compressed image data becomes low, when the correlation between the image data of the plurality of pixels becomes high.

According to the present invention, an image compression that reduces block noise and granular noise can be performed.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 6A is a conceptual view to explain (1×4) image compression;

FIG. 6B is a conceptual view to explain a decompression method for compressed image data compressed by the (1×4) image compression;

FIG. 7 is a view showing a format of (1×4) compressed data;

FIG. 8A is a conceptual view to explain (2+1×2) image compression;

FIG. 9A is a view showing a format of (2+1×2) compressed data;

FIG. 9B is a view showing a format of (2+1×2) compressed data;

FIG. 10B is a conceptual view to explain a decompression method for compressed image data compressed by the (2×2) image compression;

FIG. 11A is a view showing a format of (2×2) compressed data;

FIG. 11B is a view showing the format of (2×2) compressed data;

FIG. 12A is a conceptual view to explain (4×1) image compression;

FIG. 13 is a view showing a format of (4×1) compressed data;

FIG. 14 is a view showing an example of a basic matrix used for generating error data a;

FIG. 15 is a block diagram showing a configuration of a liquid crystal display device according to a second embodiment of the present invention;

FIG. 16 is a flowchart showing an operation of the liquid crystal display device according to the second embodiment of the present invention;

FIG. 17A is a view showing an example of a particular pattern to which a lossless compression is performed;

FIG. 17B is a view showing another example of the particular pattern to which the lossless compression is performed;

FIG. 17C is a view showing another example of the particular pattern to which the lossless compression is performed;

FIG. 17D is a view showing another example of the particular pattern to which the lossless compression is performed;

FIG. 17E is a view showing another example of the particular pattern to which the lossless compression is performed;

FIG. 17F is a view showing another example of the particular pattern to which the lossless compression is performed;

FIG. 17G is a view showing another example of the particular pattern to which the lossless compression is performed;

FIG. 17H is a view showing another example of the particular pattern to which the lossless compression is performed; and FIG. 18 is a view showing a format of lossless compression data.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

First Embodiment

1. Configuration of Liquid Crystal Display Device

Figure 1:
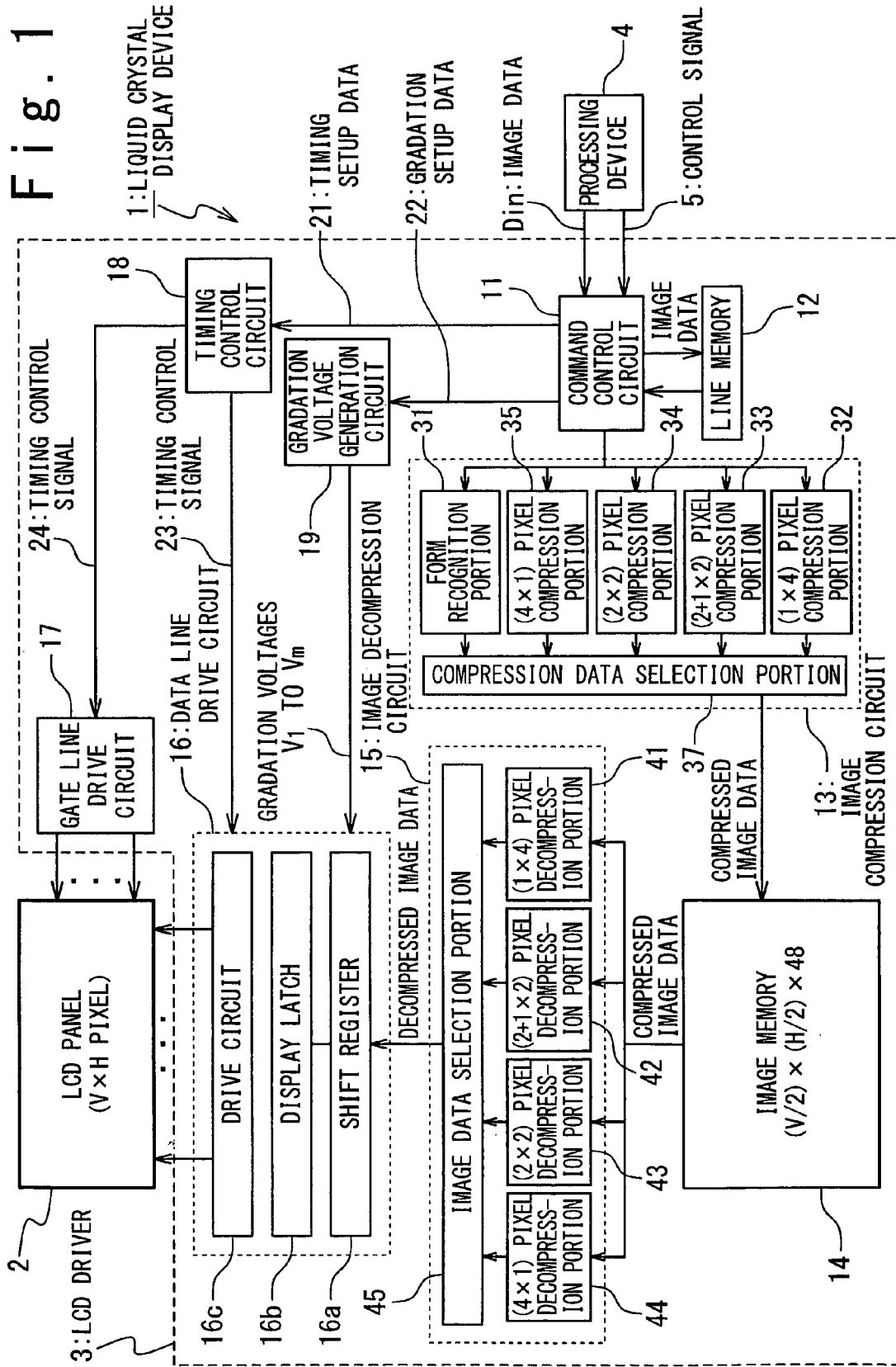
FIG. 1 is a block diagram showing a configuration of a liquid crystal display device according to a first embodiment of the present invention.

FIG. 1 is a block diagram showing a configuration of a liquid crystal display device according to a first embodiment of the present invention. A liquid crystal display device 1 according to the present invention includes an LCD panel 2 and a LCD driver 3. The LCD panel 2 includes data lines, gate lines, and pixels arranged in v rows by H columns. H pixels are provided on one horizontal line of the LCD panel 2. Each pixel includes three sub-pixels, namely, a sub-pixel corresponding to red (R sub-pixel), a sub-pixel corresponding to green (G sub-pixel), and a sub-pixel corresponding to blue (B sub-pixel). Each sub-pixel is arranged on a point where the data line and the gate line intersect one another. The LCD driver 3 drives each sub-pixel of the LCD panel 2 in response to image data Din received from a processing device 4 to display a desired image. An operation of the LCD driver 3 is controlled by control signals 5 supplied from the processing device 4. As the processing device 4, a CPU (Central Processing Unit), for example, is used.

The LDC driver 3 includes a command control circuit 11, a line memory 12, an image compression circuit 13, an image memory 14, an image decompression circuit 15, a data line drive circuit 16, a gate line drive circuit 17, a timing control circuit 18, and a gradation voltage generation circuit 19.

The command control circuit 11 has following three functions. Firstly, the command control circuit 11 supplies timing setup data 21 indicating an operational timing of the LCD driver 3 to the timing control circuit 18. Secondly, the command control circuit 11 supplies, to the gradation voltage generation circuit 19, gradation setup data 22 used for setting a relationship (that is, the γ curve) between: a voltage level of a driving voltage supplied to the LCD panel 2; and a gradation value shown in the image data Din.

Thirdly, the command control circuit 11 has a function for transferring the image data Din supplied from the processing device 4 to the image compression circuit 13. In this state, the command control circuit 11 transfers the image data Din in units of pixels of 2 rows by 2 columns to the image compression circuit 13. Since the image data is normally sent to the LCD driver in the order from pixels on an upper horizontal line, the image data Din has to be rearranged to transfer the image data Din in units of pixels of 2 rows by 2 columns to the image compression circuit 13. To perform this rearrangement, the command control circuit 11 includes the line memory 12 having a capacity for retention of the image data Din of pixels on one horizontal line.

Figure 2:
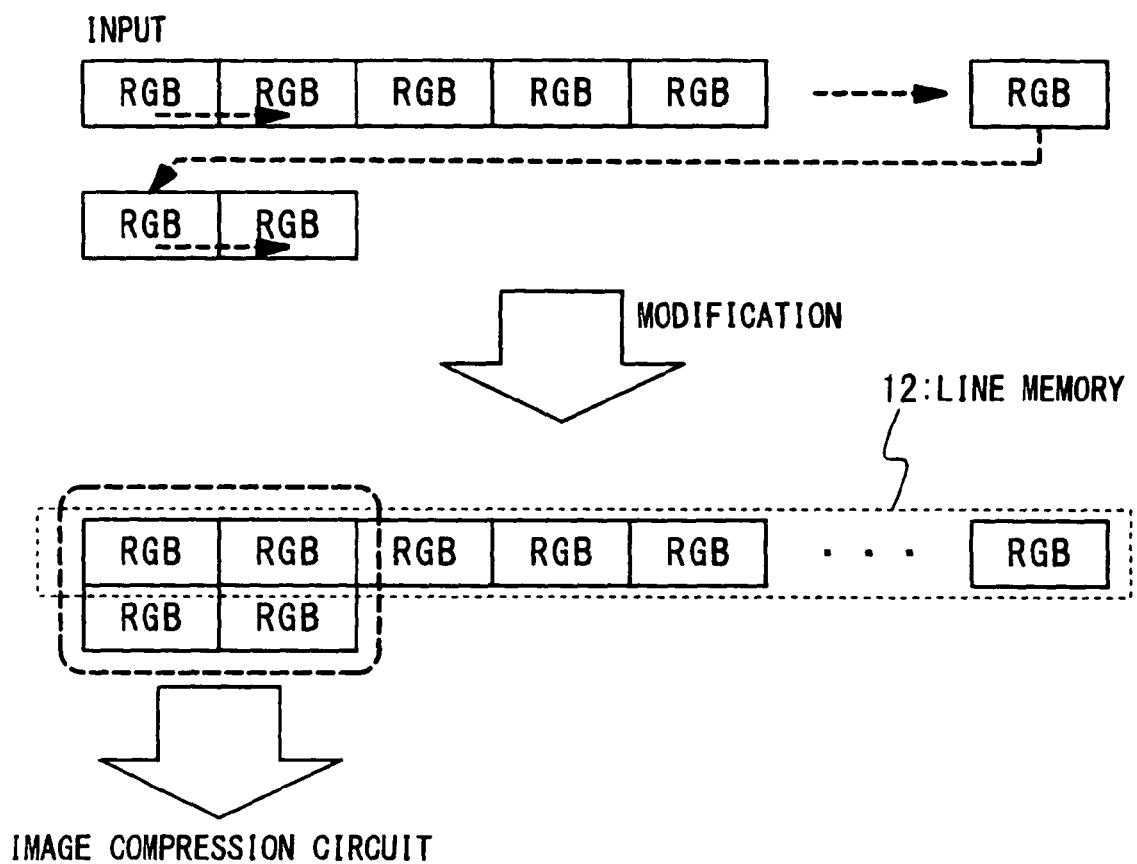
FIG. 2 is a conceptual diagram showing an operation of a line memory.

FIG. 2 is a view showing a method for transferring the image data Din to the image compression circuit 13. The image data Din is data indicating a gradation of each pixel. The image data Din, in the present embodiment, is 24-bit data representing gradations of the R sub-pixel, the G sub-pixel, and the B sub-pixel by 8 bits, respectively. When the image data Din of pixels on an odd-number horizontal line is sequentially supplied to the LCD driver 3, the command control circuit 11 stores the supplied image data Din in the line memory 12. Subsequently, when the image data Din of the left-end pixel and the second-left pixel on the odd-number horizontal line is supplied to the LCD driver 3, the image data Din of the left-end pixel and the second-left pixel on the odd-number horizontal line and the image data Din of the left-end pixel and the second-left pixel on the even-number horizontal line are collectively transferred to the image compression circuit 13. That is, image data of the leftmost pixels in 2 rows by 2 columns is transferred to the image compression circuit 13. Subsequently, when the image data Din of the third-left pixel and the fourth-left pixel on the even-number horizontal line is supplied to the LCD driver 3, the image data Din of the third-left pixel and the fourth-left pixel on the odd-number horizontal line and the image data Din of the third-left pixel and the fourth-left pixel on the even-number horizontal line are collectively transferred to the image compression circuit 13. That is, image data of the second-left pixels in 2 rows by 2 columns are transferred to the image compression circuit 13. Then, the image data Din are transferred to the image compression circuit 13 in the same manner.

The image compression circuit 13 performs an image compression process for the image data Din sent from the command control circuit 11. The image compression process by the image compression circuit 13 is performed in units of pixels in 2 rows by 2 columns. Hereinafter, the pixels in 2 rows by 2 columns that constitute a unit of the image compression process are referred to as a "block", and a block to which the image compression processing is performed is referred to as a "target block". When the image data Din of pixels of a target block are sent from the command control circuit 11, the image compression process is performed to the sent image data Din, thereby compressed image data is generated.

In the present embodiment, the compressed image data generated by the image compression circuit 13 is data representing gradations of 4 pixels constituting a block by 48 bits. Since the original image data Din represents the gradations of 4 pixels by 96 (=24×4) bits, the image compression process by the image compression circuit 13 reduces a data amount by half. That is, the number of bits of compressed image data generated regarding a certain block is half of the number of bits of the image data Din before the compression of the block. This is favorable when the image memory 14 is used for various uses. For example, a case where the image memory 14 has a size of V×H×24 bits will be considered. In this case, the image memory 14 is able to store data of 2 frames regarding compressed image data, but is able to store data of 1 frame regarding the original image data Din. In this case, an overdrive process for a moving image can be performed by storing, regarding a still image, the image data Din to the image memory 14 without compressing the image data Din, and by storing, regarding a moving image, compressed image data of two frames, a previous frame and a present frame, to the image memory 14. Here, the overdrive process is a technique for improving a response speed of a liquid crystal by driving: a voltage higher than normal voltage in a case of the driving in a positive voltage; and a voltage lower than normal voltage in a case of the driving in a negative voltage when a gradation has widely changed. In the case where the liquid crystal display device 1 is configured in this manner, the image compression circuit 13 stores, regarding a still image, the image data Din to the image memory 14 without compressing the image data Din and stores, regarding a moving image, compressed image data generated by compressing the image data Din to the image memory 14.

The image compression circuit 13 is an image processing circuit configured so that an image compression process can be performed by a plurality of compression methods. The image compression circuit 13 selects an appropriate compression method based on a correlation of image data of pixels arranged in 2 rows by 2 columns of a target block, and performs the image compression process by using the selected compression method. A configuration and an operation of the image compression circuit 13 will be explained below in detail.

The image memory 14 stores compressed image data generated by the image compression circuit 13. In the present embodiment, the image memory 14 has a size of (V/2)×(H/2)×48 bits. To enable the overdrive process to be performed to a moving image as described above, the image memory 14 may be configured to have a size of V×H×24 bits.

The image decompression circuit 15 decompresses compressed image data read from the image memory 14 to generate decompressed image data. In the present embodiment, the decompressed image data is 24-bit data representing gradations of red, green, and blue by 8 bits, respectively. A configuration and an operation of the image decompression circuit 15 will be explained below in detail. The generated decompressed image data is sent to the data line drive circuit 16.

The data line drive circuit 16 drives the LCD panel 2 in response to the decompressed image data sent from the image decompression circuit 15. Specifically, the data line drive circuit 16 includes a shift register 16a, a display latch 16b, and a drive circuit 16c. The shift register 16a sequentially receives the decompressed image data from the image compression circuit 15 and stores the received data. The shift register 16a has a capacity for retaining decompressed image data of H pixels on one horizontal line. The display latch 16b temporarily latches the decompressed image data of pixels of one horizontal line (H pixels) retained by the shift register 16a, and transfers the latched decompressed image data to the drive circuit 16c. Operational timings of the shift register 16a and the display latch 16b are controlled by a timing control signal 23 supplied from the timing control circuit 18. The drive circuit 16c drives a corresponding data line of the LCD panel 2 in response to the decompressed image data of one line sent from the display latch 16b. More specifically, the drive circuit 16c selects a corresponding gradation voltage from among a plurality of gradation voltages $V_1$ to $V_m$ supplied from the gradation voltage generation circuit 19 in response to the decompressed image data, and drives the corresponding data line of the LCD panel 2 to be the selected gradation voltage.

The gate line drive circuit 17 drives a gate line of the LCD panel 2. An operational timing of the gate line drive circuit 17 is controlled by a timing control signal 24 sent from the timing control circuit 18.

The timing control circuit 18 performs a timing control on whole of the LCD driver 3 in response to the timing setup data 21 sent from the command control circuit 11. More specifically, the timing control circuit 18 controls operational timing of the data line drive circuit 16 by supplying the timing control signal 23 to the data line drive circuit 16, and controls an operational timing of the gate line drive circuit 17 by supplying the timing control signal 24 to the gate line drive circuit 17.

The gradation voltage generation circuit 19 generates the gradation voltages $V_1$ to $V_m$ in response to the gradation setup data 22 received from the command control circuit 11, and supplies the voltages to the data line drive circuit 16. Voltage levels of the gradation voltages $V_1$ to $V_m$ are controlled based on the gradation setup data 22.

Configurations and operations of the image compression circuit 13 and the image decompression circuit 15 will be subsequently explained.

When receiving image data of pixels in 2 rows by 2 columns of a target block from the command control circuit 11, the image compression circuit 13 compresses the received image data by using any one of the following 4 compression methods, (1×4) pixel compression,
(2+1×2) pixel compression,
(2×2) pixel compression, and
(4×1) pixel compression.

Here, the (1×4) pixel compression is a method for performing a process to reduce the number of bit planes independently to each of all 4 pixels of a target block. This (1×4) pixel compression is favorable in a case where a correlation of image data of 4 pixels is low. The (2+1×2) pixel compression is a method for determining a representative value representing image data of 2 pixels of all 4 pixels of a target block and for performing a process (in the present invention, the dither processing using a dither matrix) to reduce the number of bit planes regarding each of other two pixels. This (2+1×2) pixel compression is favorable in a case where a correlation of image data of two pixels of four pixels is high and a correlation of image data of other two pixels is low. The (2×2) pixel compression is a method for, after separating all four pixels of a target block into two groups including two pixels and determining a representative value representing image data regarding each group of two pixels, compressing the image data. This (2×2) pixel compression is favorable in a case where a correlation of image data of two pixels of four pixels is high and a correlation of image data of other two pixels is high. The (4×1) pixel compression is a method for, after determining a representative value representing image data of four pixels of a target block, compressing the image data. This (4×1) pixel compression is favorable in a case where a correlation of image data of all four pixels of the target block is high. Details of the above-mentioned four compression methods will be described later.

One feature of the liquid crystal display device 1 according to the present embodiment is to accept a compression method (in the present embodiment, the 2+1×2 pixel compression and the (2×2) pixel compression) for calculating a representative value corresponding to image data of a plurality of pixels (not all) of a target block, in addition to a compression method (in the present embodiment, (4×1) pixel compression) for calculating a representative value corresponding to image data of all pixels of a target block and a compression method (in the present embodiment, (1×4) pixel compression) for performing a process to reduce the number of bit planes independently to each of all 4 pixels of a target block. This is effective in reducing block noise and granular noise. As described above, when the compression method for performing the process to reduce the number of bit planes independently to a pixel having a high correlation of image data is performed, granular noise is generated, and meanwhile when the block coding is performed to a pixel having a low correlation of image data, block noise is generated. The liquid crystal display device 1 according to the present embodiment accepting the compression method for calculating a representative value corresponding to image data of a plurality of pixels (not all) of a target block can avoid a case where: the process to reduce the number of bit planes is performed to the pixel having the high correlation of image data; or the block coding is performed to the pixel having the low correlation of image data. Accordingly, the liquid crystal display device 1 according to the present embodiment is able to reduce block noise and granular noise.

Determination as to which one of four compressions is used is made on the basis of a correlation of image data of pixels in 2 rows by 2 columns. For example, the (4×1) pixel compression is used in a case where a correlation of image data of all four pixels in 2 rows by 2 columns is high, and the (2×2) pixel compression is used in a case where a correlation of image data of two pixels of four pixels is high and a correlation of image data of other two pixels is high. Details of selection of the compression methods will be described below.

To perform the above-mentioned operation, the image compression circuit 13 includes a form recognition portion 31, a (1×4) pixel compression portion 32, a (2+1×2) pixel compression portion 33, a (2×2) pixel compression portion 34, a (4×1) pixel compression portion 35, and a compression data selection portion 37.

The form recognition portion 31 receives image data of pixels in 2 rows by 2 columns from the command control circuit 11, and recognizes a correlation of the received image data of pixels in 2 rows by 2 columns. For example, the form recognition portion 31 recognizes: which one of combinations of pixels of the pixels in 2 rows by 2 columns realizes a higher correlation of image data; or which pixel has a low correlation of image data with respect to other pixels. Moreover, the form recognition portion 31, in response to the recognition result, generates form recognition data to instruct which one of the four compression methods, (1×4) pixel compression, (2+1×2) pixel compression, (2×2) pixel compression, and (4×1) pixel compression should be used.

The (1×4) pixel compression portion 32, (2+1×2) pixel compression portion 33, (2×2) pixel compression portion 34, and (4×1) pixel compression portion 35 perform the above-mentioned (1×4) pixel compression, (2+1×2) pixel compression, (2×2) pixel compression, and (4×1) pixel compression, respectively, and generates (1×4) compressed data, (2+1×2) compressed data, (2×2) compressed data, and (4×1) compressed data, respectively.

Based on the form recognition data sent from the form recognition portion 31, the compression data selection portion 37 outputs any one of the (1×4) compressed data, the (2+1×2) compressed data, the (2×2) compressed data, and the (4×1) compressed data as compressed image data to the image memory 14. The compressed image data includes a compression-type recognition bit that indicates which one of the above-mentioned four compression methods was used. The image memory 14 stores the compressed image data received from the compression data selection portion 37.

The image decompression circuit 15 determines which one of the above-mentioned four compression methods compressed the compressed image data read from the image memory 14, and decompresses the compressed image data by using a decompression method corresponding to a compression method used for the compression. To perform such operations, the image decompression circuit 15 includes a (1×4) pixel decompression portion 41, a (2+1×2) pixel decompression portion 42, a (2×2) pixel decompression portion 43, a (4×1) pixel decompression portion 44, and an image data selection portion 45. The (1×4) pixel decompression portion 41, (2+1×2) pixel decompression portion 42, (2×2) pixel decompression portion 43, and (4×1) pixel decompression portion 44 have a function for decompressing compressed image data compressed by the (1×4) pixel compression, (2+1×2) pixel compression, (2×2) pixel compression, and (4×1) pixel compression, respectively. The image data selection portion 45 recognizes the compression method actually used for the compression on the basis of the compression type recognition bit included in compressed image data, and selects, as decompressed image data, data decompressed and generated by the decompression method corresponding to the compression method actually used for the compression from among image data outputted from the (1×4) pixel decompression portion 41, the (2+1×2) pixel decompression portion 42, the (2×2) pixel decompression portion 43, and the (4×1) pixel decompression portion 44. The decompressed image data is supplied to the data line drive circuit 16 and is used to drive the LCD panel 2.

Figure 3:
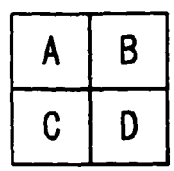
FIG. 3 is a view showing arrangement of pixels of a target block.

In what follows, details of: a method for recognizing a correlation of image data of pixels in 2 rows by 2 columns; and the above-mentioned five compression methods will be explained. In the following explanation, as shown in FIG. 3, in the pixels in 2 rows by 2 columns, an upper left pixel is referred to as a pixel A, an upper right pixel is referred to as a pixel B, an lower left pixel is referred to as a pixel C, and an lower right pixel is referred to as a pixel D. In addition, gradation values of the R sub-pixels of the pixels A, B, C, and D are written as $R_A$, $R_B$, $R_C$, and $R_D$, respectively, gradation values of the G sub-pixels of the pixels A, B, C, and D are written as $G_A$, $G_B$, $G_C$, and $G_D$, respectively, and gradation values of the B sub-pixels of the pixels A, B, C, and D are written as $B_A$, $B_B$, $B_C$, and $B_D$, respectively.

2. Method for Recognizing a Correlation

In the method for recognizing a correlation by the form recognition portion 31 of the image compression circuit 13, it is judged which one of following cases is applied to image data of target 4 pixels in 2 rows by 2 columns.

Figure 4A:
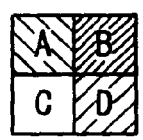
FIGS. 4A to 4D are conceptual diagrams showing correlations of image data of pixels in the target block.

Case A: A correlation between image data of arbitrarily-combined pixels of four pixels is low (FIG. 4A).

Figure 4B:

Case B: There is a high correlation between image data of two pixels, and image data of other two pixels have a low correlation with the former two pixels and have a low correlation with each other (FIG. 4B).

Figure 4C:
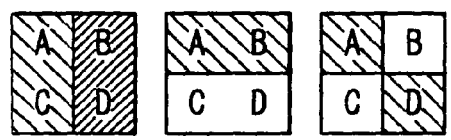

Case C: There is a high correlation between image data of two pixels, and there is a high correlation between image data of other two pixels (FIG. 4C).

Figure 4D:
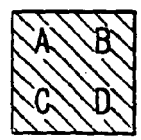

Case D: There is a high correlation of image data of four pixels (FIG. 4D).

Figure 5:
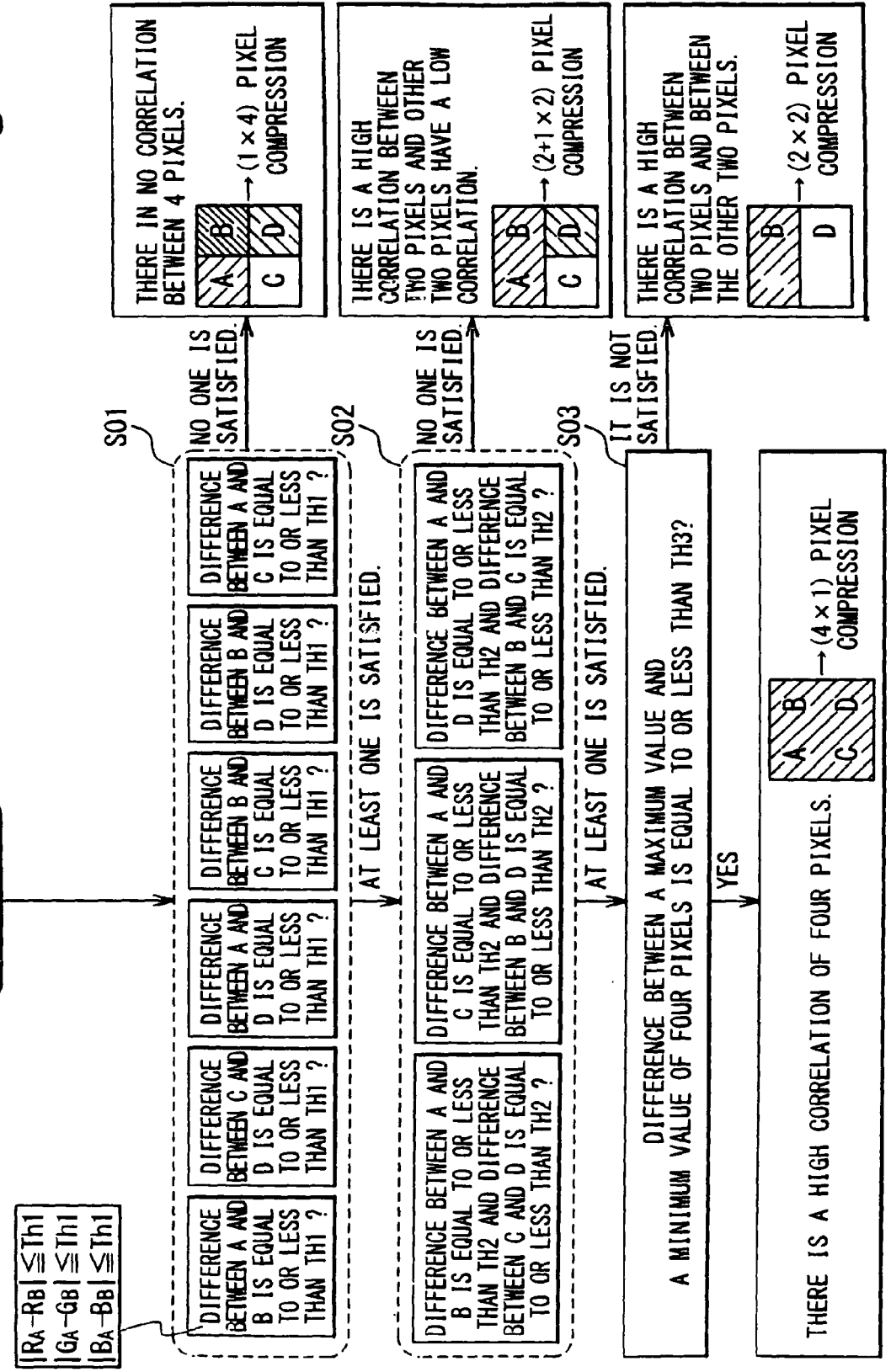
FIG. 5 is a flowchart showing a procedure of judgment of correlations of image data in the first embodiment.

FIG. 5 is a flowchart showing the method for recognizing a correlation according to the present embodiment.

At first, when the following condition (A) is not satisfied with respect to all combinations of i and j; wherein
 i∈{A, B, C, D},
 j∈{A, B, C, D}, and
 j≠i,
the form recognition portion 31 judges this matter is applied to the case A (that is, correlation between image data of arbitrarily-combined pixels of four pixels is low) (Step S01).
Condition (A):
 $|R_i-R_j| \leq Th\mathbf{1}$,
 $|G_i-G_j| \leq Th\mathbf{1}$, and
 $|B_i-B_j| \leq Th\mathbf{1}$.

When the matter is applied to the case A, the form recognition portion 31 determines to perform the (1×4) pixel compression. Here, Th1 is a predetermined value.

When the matter is not applied to the case A, the form recognition portion 31 defines two pixels of a first combination and the other two pixels of a second combination regarding four pixels, and judges whether or not the following condition is satisfied regarding the all combinations. The condition is that: a difference between image data of two pixels of the first combination is smaller than a predetermined value; and a difference between image data of two pixels of the second combination is smaller than a predetermined value. More specifically, the form recognition portion 31 judges whether or not the following conditions (B1) to (B3) are satisfied (Step S02).
Condition (B1):
 $|R_A-R_B| \leq Th\mathbf{2}$,
 $|G_A-G_B| \leq Th\mathbf{2}$,
 $|B_A-B_B| \leq Th\mathbf{2}$,
 $|R_C-R_D| \leq Th\mathbf{2}$,
 $|G_C-G_D| \leq Th\mathbf{2}$, and
 $|B_C-B_D| \leq Th\mathbf{2}$.
Condition (B2):
 $|R_A-R_C| \leq Th\mathbf{2}$,
 $G_A-G_C \leq Th\mathbf{2}$,
 $B_A-B_C \leq Th\mathbf{2}$,
 $|R_B-R_D| \leq Th\mathbf{2}$,
 $G_B-G_D \leq Th\mathbf{2}$, and
 $|B_B-B_D| \leq Th\mathbf{2}$.
Condition (B3):
 $|R_A-R_D| \leq Th\mathbf{2}$,
 $|G_A-G_D| \leq Th\mathbf{2}$,
 $|B_A-B_D| \leq Th\mathbf{2}$,
 $|R_B-R_C| \leq Th\mathbf{2}$,
 $|G_B-G_C| \leq Th\mathbf{2}$, and
 $|B_B-B_C| \leq Th\mathbf{2}$.

When any one of the above-mentioned conditions (B1) to (B3) is not satisfied, the form recognition portion 31 recognizes the matter is applied to the case B (that is, there is a high correlation between image data of two pixels and image data of other two pixels have a low correlation with each other). In this instance, the form recognition portion 31 determines to perform the (2+1×2) pixel compression. Here, Th2 is a predetermined value.

When it is determined that the matter is not applied to both of the cases A and B, the form recognition 31 judges whether or not the following condition is satisfied regarding all colors of the four pixels. The condition is that a difference between a maximum value and a minimum value of image data of four pixels is smaller than a predetermined value. More specifically, the form recognition portion 31 judges whether or not a following condition (C) is satisfied (Step S03).
Condition (C):
 max $(R_A, R_B, R_C, R_D)$−min $(R_A, R_B, R_C, R_D)$<Th3,
 max $(G_A, G_B, G_C, G_D)$−min $(G_A, G_B, G_C, G_D)$<Th3, and
 max $(B_A, B_B, B_C, B_D)$−min $(B_A, B_B, B_C, B_D)$<Th3.

When the condition (C) is not satisfied, the form recognition portion 31 determines the matter is applied to the case C (that is, there is a high correlation between image data of two pixels, and there is a high correlation between image data of other two pixels). In this instance, the form recognition portion 31 determines to perform the (2×2) pixel compression. Here, Th3 is a predetermined value.

Meanwhile, when the condition (C) is not satisfied, the form recognition portion 31 determines that the matter is applied to the case D (there is a high correlation of image data of four pixels). In this instance, the form recognition portion 31 determines to perform the (4×1) pixel compression.

Based on the above-mentioned recognition result of the correlation, the form recognition portion 31 generates form recognition data to instruct which one of the (1×4) pixel compression, the (2+1×2) pixel compression, the (2×2) pixel compression, and the (4×1) pixel compression should be used and sends the generated data to the compression data selection portion 37. As described above, based on the form recognition data sent from the form recognition portion 31, the compression data selection portion 37 outputs any one of the (1×4) compressed data, (2+1×2) compressed data, (2×2) compressed data, and (4×1) compressed data as compressed image data to the image memory 14.

3. Details of Compression Method and Decompression Method

The (1×4) pixel compression, the (2+1×2) pixel compression, the (2×2) pixel compression, the (4×1) pixel compression, and decompression methods of compressed image data compressed these compression methods will be subsequently explained.

3-1. (1×4) Pixel Compression and Decompression Thereof

FIG. 6A is a schematic view to explain the (1×4) image compression, and FIG. 7 is a schematic view showing a format of (1×4) compressed data. As described above, the (1×4) pixel compression is a compression method employed when a correlation between image data of arbitrarily-combined pixels of four pixels is low. As shown in FIG. 7, in the present embodiment, the (1×4) compressed data includes: a compression type recognition bit; $R_A$ data, $G_A$ data, and $B_A$ data corresponding to image data of the pixel A; $R_B$ data, $G_B$ data, and $B_B$ data corresponding to image data of the pixel B; $R_C$ data, $G_C$ data, and $B_C$ data corresponding to image data of the pixel C; and $R_D$ data, $G_D$ data, and $B_D$ data corresponding to image data of the pixel D. The (1×4) compressed data is 48-bit data. Here, the compression type recognition bit is data that indicates a type of compression method used for a compression, and one bit is allocated to the compression type recognition bit in the (1×4) compressed data. In the present embodiment, a value of the compression type recognition bit of the (1×4) compressed data is "0".

Meanwhile, $R_A$ data, $G_A$ data, and $B_A$ data are bit plane reduction data obtained by performing a process to reduce bit planes on gradation values of an R sub-pixel, a G sub-pixel, and a B sub-pixel of the pixel A, and $R_B$ data, $G_B$ data, and $B_B$ data are bit plane reduction data obtained by performing a process to reduce bit planes on gradation values of an R sub-pixel, a G sub-pixel, and a B sub-pixel of the pixel B. Similarly, $R_C$ data, $G_C$ data, and $B_C$ data are bit plane reduction data obtained by performing a process to reduce bit planes on gradation values of an R sub-pixel, a G sub-pixel, and a B sub-pixel of the pixel C, and $R_D$ data, $G_D$, data and $B_D$ data are bit plane reduction data obtained by performing a process to reduce bit planes on gradation values of a R sub-pixel, a G sub-pixel, and a B sub-pixel of the pixel D. In the present embodiment, only the $B_D$ data corresponding to the B sub-pixel of the pixel D is 3-bit data, and others are 4-bit data.

Referring to FIG. 6A, the (1×4) pixel compression will be explained below. In the (1×4) pixel compression, the dither processing using the dither matrix is performed on each of the pixels A to D, thereby the number of bit planes of image data of each of the pixels A to D is reduced. Specifically, a process to add error data a to each of image data of pixels A, B, C, and D is performed at first. In the preset embodiment, the error data α (alpha) of each pixel is determined on the basis of coordinates of the pixel by using a basic matrix, the Bayer-Matrix. The calculation of the error data α will be described later. Here, the explanation will be performed supposing that the error data α determined for the pixels A, B, C, and D are 0, 5, 10, and 15, respectively.

Moreover, a rounding process and a bit round-down process are performed, thereby $R_A$ data, $G_A$ data, and $B_A$ data, $R_B$ data, $G_B$ data, and $B_B$ data, $R_C$ data, $G_C$ data, and $B_C$ data, and $R_D$ data, $G_D$ data, and $B_D$ data are generated. Specifically, as for a gradation value of the B sub-pixel of the pixel D, a process to round lower 5 bits down is performed after adding a value 16. As for each of other gradation values, a process to round lower 4 bits down is performed after adding a value 8. By adding a value "0" as a compression type recognition bit to the $R_A$ data, the $G_A$ data, and the $B_A$ data, the $R_B$ data, the $G_B$ data, and the $B_B$ data, the $R_C$ data, the $G_C$ data, and the $B_C$ data, and the $R_D$ data, the $G_D$ data, and the $B_D$ data each generated in this manner, (1×4) compressed data is generated.

FIG. 6B is a view showing a decompression method of compressed image data compressed by the (1×4) pixel compression. In a decompression of the compressed image data compressed by the (1×4) pixel compression, rounding up of bits of the $R_A$ data, the $G_A$ data, and the $B_A$ data, the $R_B$ data, the $G_B$ data, and the $B_B$ data, the $R_C$ data, the $G_C$ data, and the $B_C$ data, and the $R_D$ data, the $G_D$ data, and the $B_D$ data is firstly performed. Specifically, as for the $B_D$ data corresponding to the B sub-pixel of the pixel D, rounding up of 5 bits is performed, and as for other data, rounding up of 4 bits is performed.

Furthermore, subtraction of the error data a is performed, thereby image data of pixels A to D (that is, gradation values of R sub-pixel, G sub-pixel, and B sub-pixel) are extracted. Comparing image data of pixels A to D in a rightmost table of FIG. 6B with image data of pixels A to D in a leftmost table of FIG. 6A, it can be understood that original image data of pixels A to D are almost extracted by the above-mentioned decompression method.

3-2. (2+1×2) Pixel Compression

Figure 8A:
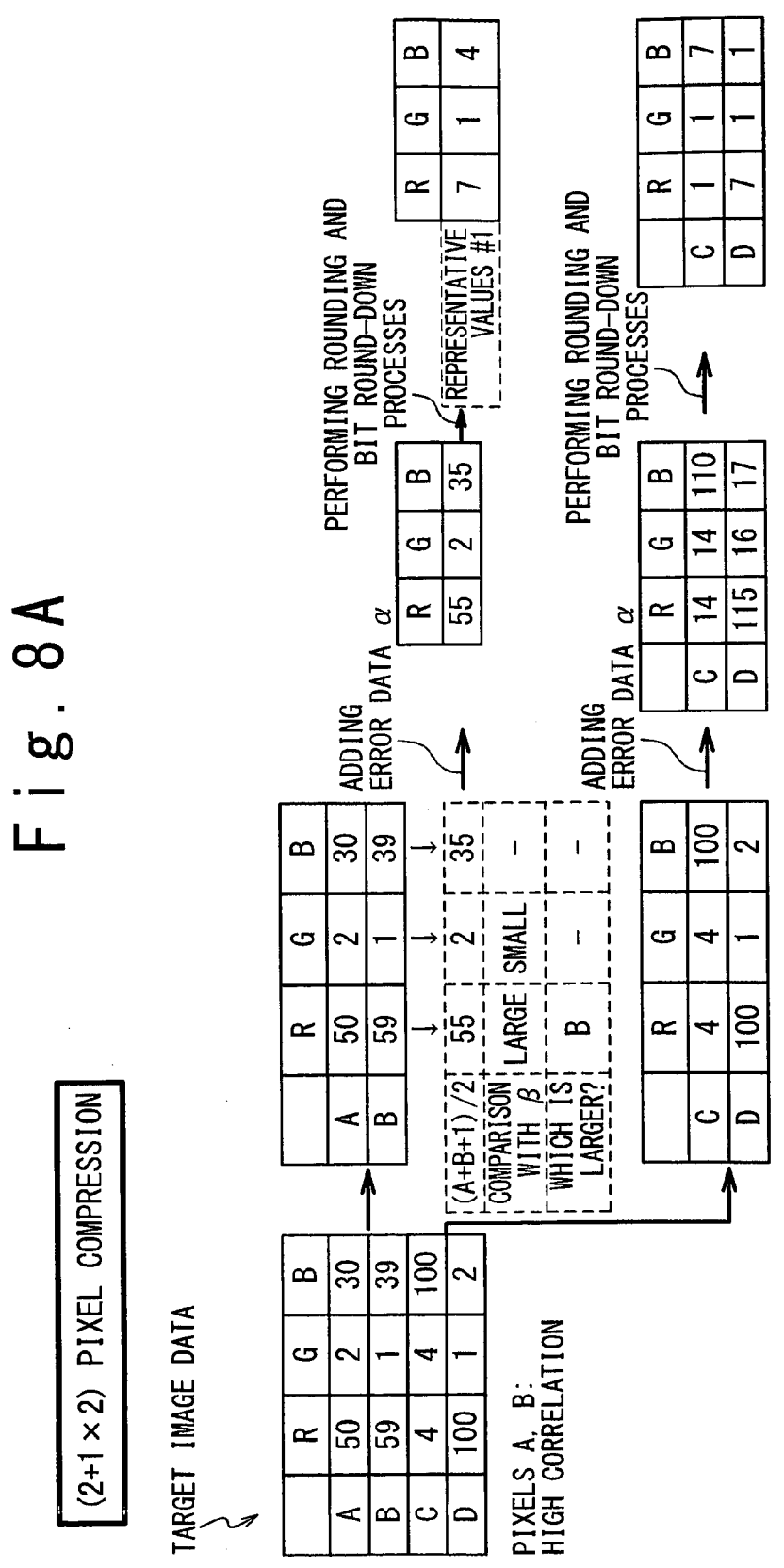

FIG. 8A is a conceptual view to explain the (2+1×2) pixel compression, and FIG. 9A is a conceptual view showing a format of the (2+1×2) compressed data. As described above, the (2+1×2) pixel compression is employed when there is a high correlation between image data of two pixels, and image data of other two pixels have a low correlation with the former two pixels and have low correlation with each other. As shown in FIG. 9A, in the present embodiment, the (2+1×2) compressed data includes: a compression type recognition bit; form recognition data; a R representative value; a G representative value; a B representative value; large-small recognition data; β (beta) comparison result data; $R_i$ data, $G_i$ data, and $B_i$ data; and $R_j$ data, $G_j$ data, and $B_j$ data. The (2+1×2) compressed data is 48-bit data same as the above-mentioned (1×4) compressed data.

The compression type recognition bit is data that indicates a type of compression method used for compression, and 2 bits are allocated to the compression type recognition bit in the (2+1×2) compressed data. In the present embodiment, a value of the compression type recognition bit of the (2+1×2) compressed data is "10".

The form recognition data is 3-bit data that indicates which one of correlations between image data of two pixels of the pixels A to D is high. When the (2+1×2) pixel compression is employed, one of a correlation of image data between two pixels of the pixels A to D is high and a correlation of image data of remaining two pixels with the former two pixels is low. Accordingly, there are six combinations of two pixels having a high correlation of image data as follows;

the pixels A and C,
the pixels B and D,
the pixels A and B,
the pixels C and D,
the pixels B and C, and
the pixels A and D.

The form recognition data indicates which one of the six combinations is a combination of the two pixels having a high correlation between image data by using 3 bits.

The R representative value, the G representative value, and the B representative value are values representing gradation values of an R sub-pixel, a G sub-pixel, and a B sub-pixel of two pixels having a high correlation, respectively. In an example of FIG. 9A, the R representative value and the G representative value are 5-bit or 6-bit data, and the B representative value is 5-bit data.

β comparison data is data that indicates whether or not a difference between gradation values of R sub-pixels of two pixels having a high correlation and a difference between image data of G sub-pixels of the two pixels having a high correlation are greater than a predetermined threshold value β. In the present embodiment, the β comparison data is 2-bit data. Meanwhile, the large-small recognition data is data that indicates: which one of the gradation values of the R sub-pixels of the two pixels having a high correlation is larger; and which one of the gradation values of the G sub-pixels of the two pixels is larger. The large-small recognition data corresponding to the R sub-pixel is generated only when the difference between gradation values of R sub-pixels of two pixels having a high correlation is larger than the threshold value β, and the large-small recognition data corresponding to the G sub-pixel is generated only when the difference between gradation values of G sub-pixels of two pixels having a high correlation is larger than the threshold value β. Accordingly, the large-small recognition data is 0 to 2-bit data.

The $R_i$ data, the $G_i$ data, and the $B_i$ data and the $R_j$ data, the $G_j$ data, and the $B_j$ data are bit plane reduction data obtained by performing a process to reduce bit planes on gradation values of the R sub-pixel, the G sub-pixel, and the B sub-pixel of two pixels having a low correlation. In the present embodiment, each of: the $R_i$ data, the $G_i$ data, and the $B_i$ data; and the $R_j$ data, the $G_j$ data, and the $B_j$ data is 4-bit data.

Referring to FIG. 8A, the (2+1×2) pixel compression will be explained below. FIG. 8A describes generation of the (2+1×2) compressed data in a case where: a correlation between image data of the pixels A and B is high; image data of the pixels C and D have a low correlation with image data of the pixels A and B; and image data of the pixels C and D have a low correlation with each other. A person skilled in the art will easily understand that the (2+1×2) compressed data can be generated in the same manner also in other cases.

A process to compress image data of the pixels A and B (having a high correlation) will be firstly explained. First of all, regarding each of the R sub-pixel, the G sub-pixel, and the B sub-pixel, an average value of gradation values is calculated. The average values Rave, Gave, and Bave of the gradation values of the R sub-pixel, the G sub-pixel, and the B sub-pixel are calculated by the following expressions, $$Rave=(R_A+R_B+1)/2,$$

$$Gave=(G_A+G_B+1)/2,$$

$$Bave=(B_A+B_B+1)/2.$$

In addition, comparisons are performed whether or not a difference $|R_A-R_B|$ of gradation values of R sub-pixels of the pixels A and B and a difference $|G_A-G_B|$ of gradation values of G sub-pixels are respectively larger than the predetermined threshold value β. This comparison result is described in the (2+1×2) compressed data as the f comparison data.

Moreover, in a following procedure, large-small recognition data related to the R sub-pixel and G sub-pixel of the pixels A and B are created. When the difference $|R_A-R_B|$ of gradation values of R sub-pixels of the pixels A and B is larger than the threshold value β, it is described to the large-small recognition data which one of gradation values of the R sub-pixels of the pixels A and B is larger. When the difference $|R_A-R_B|$ of gradation values of R sub-pixels of the pixels A and B is equal to or less than the threshold value β, the magnitude relation of the gradation values of the R sub-pixels of the pixels A and B is not described in the large-small recognition data. In the same manner, when the difference $|G_A-G_B|$ of gradation values of G sub-pixels of the pixels A and B is larger than the threshold value β, it is described to the large-small recognition data which one of gradation values of the G sub-pixels of the pixels A and B is larger. When the difference $|G_A-G_B|$ of gradation values of G sub-pixels of the pixels A and B is equal to or less than the threshold value β, the magnitude relation of the gradation values of the G sub-pixels of the pixels A and B is not described in the large-small recognition data.

In the example of FIG. 8A, the gradation values of the R sub-pixels of the pixels A and B are 50 and 59, respectively, and the threshold value β is 4. In this instance, since the difference $|R_A-R_B|$ of the gradation values is larger than the threshold value β, the result is described in the β comparison data, and it is described to the large-small recognition data that the gradation value of the R sub-pixel of the pixel B is larger than the gradation value of the R sub-pixel of the pixel A. Meanwhile, the gradation values of the G sub-pixels of the pixels A and B are 2 and 1, respectively. Since the difference $|G_A-G_B|$ of the gradation values is equal to or less than the threshold value β, the result is described in the β comparison data. The magnitude relation of the gradation values of the G sub-pixels of the pixels A and B is not described in the large-small recognition data. As the result, in the example of FIG. 8A, the large-small recognition data is 1-bit data.

Subsequently, the error data a is added to average values Rave, Gave, and Bave of the gradation values of the R sub-pixel, the G sub-pixel, and B sub-pixel. In the present embodiment, the error data a is determined on the basis of coordinates of the two pixels of each combination by using a basic matrix. The calculation of the error data a will be described below. Supposing that the error data a determined for the pixels A and B is "0", the present embodiment will be explained below.

Moreover, a rounding process and a bit round-down process are performed, thereby the R representative value, the G representative value, and the B representative value are calculated. Specifically, a value added in the rounding processes regarding the R sub-pixel and the G sub-pixel and the number of bits rounded down in the bit round-down process are determined depending on the magnitude relation of the threshold value β with the differences $|R_A-R_B|$ and $|G_A-G_B|$ of the gradation values. As for the R sub-pixel, when the difference $|R_A-R_B|$ of the gradation values of R sub-pixels is larger than the threshold value β, a process to round lower 3 bits down after adding a value 4 to the average value Rave of the gradation values of the R sub-pixels is performed, thereby the R representative value is calculated. When the difference $|R_A-R_B|$ is not larger than the threshold value β, a process to round lower 2 bits down after adding a value 2 to the average value Rave is performed, thereby the R representative value is calculated. In the same manner, also as for the G sub-pixel, when the difference $|G_A-G_B|$ of the gradation values is larger than the threshold value β, a process to round lower 3 bits down after adding a value 4 to the average value Gave of the gradation values of the G sub-pixels is performed, thereby the G representative value is calculated. When the difference $|G_A-G_B|$ is not larger than the threshold value β, a process to round lower 2 bits down after adding a value 2 to the average value Gave is performed, thereby the G representative value is calculated. In the example of FIG. 8A, as for the average value Rave of the R sub-pixel, a process to round lower 3 bits down after adding a value 4 is performed, and as for the average value Gave of the G sub-pixel, a process to round lower 2 bits down after adding a value 2 is performed.

Meanwhile, as for the B sub-pixel, a process to round lower 3 bits down after adding a value 4 to the average value Bave of the gradation values of the B sub-pixels is performed, thereby the B representative value is calculated. As described above, compression processes of image data of the pixels A and B are completed.

As for image data of the pixels C and D (having a low correlation), a process same as that of the (1×4) pixel compression is performed. That is, the dither processing using a dither matrix is performed independently on each of the pixels C and D, thereby the number of bit planes of image data of each of the pixels C and D is reduced. Specifically, a process to add the error data α to each of image data of the pixels C and D is firstly performed. As described above, the error data a of each pixel is calculated from the coordinates of the pixels. Supposing that the error data α determined for the pixels C and D are 10 and 15, respectively, the explanation will be continued below.

Moreover, a rounding process and a bit round-down process are performed, thereby $R_C$ data, $G_C$ data, and $B_C$ data, and $R_D$ data, $G_D$ data, and $B_D$ data are generated. Specifically, a process to round lower 4 bits down after adding a value 8 to each of the gradation values of the R sub-pixel, the G sub-pixel, and the B sub-pixel of each of the pixels C and D is performed. In this manner, the $R_C$ data, the $G_C$, data and the $B_C$ data and the $R_D$ data, the $G_D$ data, and the $B_D$ data are calculated.

By adding the compression type recognition bit and the form recognition data to the R representative value, the G representative value, the B representative value, the large-small recognition data, the β comparison result data, the $R_C$ data, the $G_C$ data, and the $B_C$ data, and the $R_D$ data, the $G_D$ data, and the $B_D$ data each generated in the above-mentioned manner, the (2+1×2) compression data is generated.

Figure 8B:
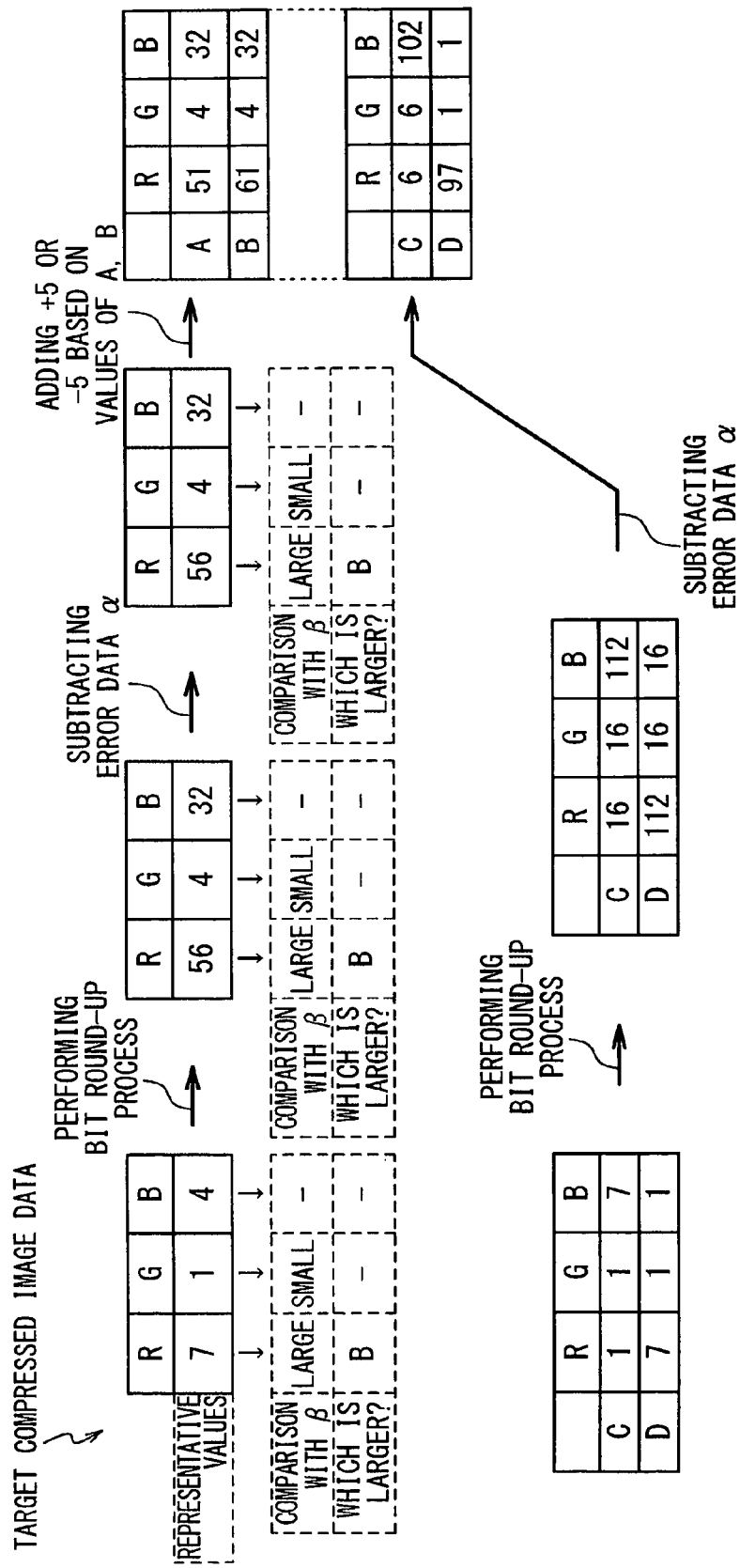
FIG. 8B is a conceptual view to explain a decompression method for compressed image data compressed by the (2+1×2) image compression.

FIG. 8B is a view showing a decompression method of the compressed image data compressed in the (2+1×2) pixel compression. FIG. 8B describes decompression of the (2+1×2) compressed data in a case where: a correlation between image data of the pixels A and B is high; image data of the pixels C and D have a low correlation with image data of the pixels A and B; and image data of the pixels C and D have a low correlation with each other. A person skilled in the art will easily understand that the (2+1×2) compressed data can be decompressed in the same manner also in other cases.

A process to decompress image data of the pixels A and B (having a high correlation) will be firstly explained. First of all, a bit round-up process is performed on each of the R representative value, the G representative value, and the B representative value. The number of bits of the bit round-up process to each of the R representative value and the G representative value is determined depending on the magnitude relation of the threshold value β with each of the differences $|R_A-R_B|$ and $|G_A-G_B|$ of the gradation values, the magnitude relation being described in the β comparison data. When the difference $|R_A-R_B|$ of gradation values of R sub-pixels is larger than the threshold value β, the bit round-up process of 3 bits is performed on the R representative value, and when the difference $|R_A-R_B|$ is not larger than the threshold value β, the bit round-up process of 2 bits is performed. In the same manner, when the difference $|G_A-G_B|$ of gradation values of G sub-pixels is larger than the threshold value β, the bit round-up process of 3 bits is performed on the G representative value, and when the difference $|G_A-G_B|$ is not larger than the threshold value β, the bit round-up process of 2 bits is performed. In the example of FIG. 8B, regarding the R representative value, the process to round 3 bits up is performed, and regarding the G representative value, the process to round 2 bits up is performed. Meanwhile, regarding the B representative value, the process to round 3 bits up is performed.

In addition, after subtraction of the error data α is performed on each of the R representative value, the G representative value, and the B representative value, a process to extract the gradation values of the R, G, and B sub-pixels of the pixels A and B from the R representative value, the G representative value, and the B representative value is performed.

In the extraction of the gradation values of the R sub-pixels of the pixels A and B, the β comparison data and the large-small recognition data are used. When it is described in the β comparison data that the difference $|R_A-R_B|$ of the gradation values of the R sub-pixels is larger than the threshold value β, a value obtained by adding a constant value 5 to the R representative value is extracted as the gradation value of the R sub-pixel of larger one of the pixels A and B described in the large-small recognition data, and a value obtained by subtracting a constant value 5 from the R representative value is extracted as the gradation value of the R sub-pixel of smaller one of the pixels A and B described in the large-small recognition data. On the other hand, when the difference $|R_A-R_B|$ of the gradation values of the R sub-pixels is smaller than the threshold value β, the gradation values of the R sub-pixels of the pixels A and B is extracted as being equal to the R representative value. In the example of FIG. 8B, the gradation value of the R sub-pixel of the pixel A is extracted as a value obtained by subtracting a value 5 from the R representative value, and the gradation value of the R sub-pixel of the pixel B is extracted as a value obtained by adding a value 5 to the R representative value.

Also in an extraction of the gradation values of the G sub-pixels of the pixels A and B, the same process is Performed by using the β comparison data and the large-small recognition data. In the example of FIG. 8B, both of values of the G sub-pixels of the pixels A and B are extracted as being equal to the G representative value.

On the other hand, in an extraction of the gradation values of the B sub-pixels of the pixels A and B, independently of the β comparison data and the large-small recognition data, both of values of the B sub-pixels of the pixels A and B are extracted as being equal to the B representative value.

In the above-described manner, the extraction of the gradation values of the R sub-pixels, G sub-pixels, and B sub-pixels of the pixels A and B is completed.

In a decompression process regarding image data of the pixels C and D (having a low correlation), the same process as the above-mentioned decompression process of the (1×4) compressed data is performed. In the decompression process regarding image data of the pixels C and D, a bit round-up process of 4 bits is performed to each of: the $R_C$ data, the $G_C$ data, and the $B_C$ data; and the $R_D$ data, the $G_D$ data, and the $B_D$ data. In addition, subtraction of the error data α is performed, thereby image data of the pixels C and D (that is, the gradation values of the R sub-pixels, the G sub-pixels, and the B sub-pixels) are extracted. In the above-described manner, the decompression of the gradation values of the R sub-pixels, G sub-pixels, and B sub-pixels of the pixels C and D is completed.

Comparing image data of pixels A to D in rightmost tables of FIG. 8B with image data of pixels A to D in a leftmost table of FIG. 8A, it can be understood that the original image data of pixels A to D are almost extracted by the above-mentioned decompression method.

As a modified example of the compression method and the decompression method of FIGS. 8A and 8B, while 3 bits are provided to the form recognition data, the number of combinations of two pixels having a high correlation of image data is six, and regarding a certain combination of the pixels, the number of bits provided to its representative value can be accordingly increased. For example, the form recognition data is defined as follows (x is any value of "0" and "1")

combination of pixels A and B is 00x,
combination of pixels A and C is 010,
combination of pixels A and D is 011,
combination of pixels B and C is 100,
combination of pixels B and D is 101, and
combination of pixels C and D is 11x.

In the instance, when two pixels having a high correlation of image data are the pixels A and B and when two pixels having a high correlation of image data are the pixels C and D, the number of bits provided to the form recognition data is set to be 2 bits, and additionally the number of bits provided to any one of the R representative value, the G representative value, and the B representative value can be increased by 1 bit.

FIG. 9B is a view showing a format of the (2+1×2) compression data of a case where: two pixels having a high correlation of image data are the pixels A and B or the pixels C and D; and the number of bits provided to the G representative value is increased by 1 bit. In the format of FIG. 9B, 2 bits are provided to the form recognition data, and 6 bits or 7 bits are provided to the G representative value depending on the magnitude relation between the threshold value β and the difference $|G_A-G_B|$ of the gradation values. By increasing the number of bits provided to the G representative value, information amount is increased, thereby a compression distortion can be reduced. In this instance, a round-up process of 1 bit or 2 bits is performed on the G representative value in the decompression process. The number of bits of the round-up process is determined depending on the magnitude relation between the threshold value β and the difference $|G_A-G_B|$ of the gradation values.

3-3. (2×2) Pixel Compression

Figure 10A:
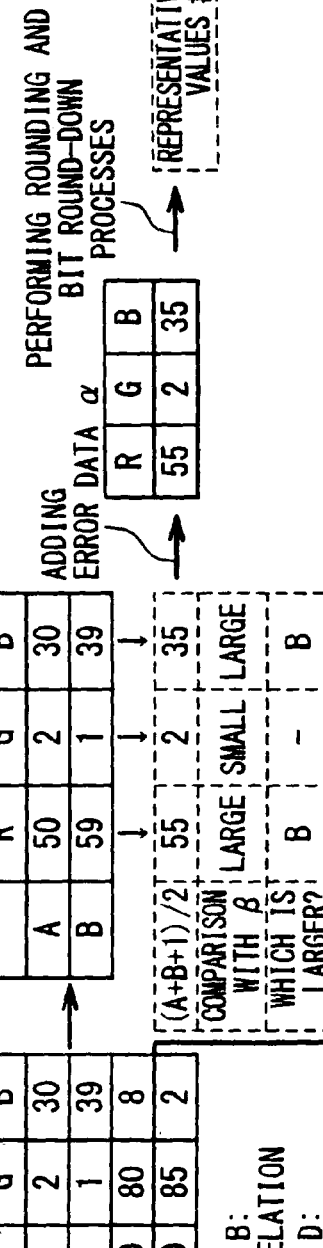
FIG. 10A is a conceptual view to explain (2×2) image compression.

FIG. 10A is a conceptual view to explain the (2×2) pixel compression, and FIG. 11A is a conceptual view showing a format of the (2×2) pixel compression. As described above, the (2×2) pixel compression is a compression method used when there is a high correlation between image data of two pixels and there is a high correlation between image data of other two pixels. As shown in FIG. 11A, in the present embodiment, the (2×2) compression data is 48-bit data, and includes the compression type recognition bit, the form recognition data, a R representative value #1, a G representative value #1, a B representative value #1, a R representative value #2, a G representative value #2, a B representative value #2, the large-small recognition data, and the β comparison result data.

The compression type recognition bit is data that indicates a type of a compression method used for a compression, and 3 bits are allocated to the compression type recognition bit in the (2×2) compression data. In the present embodiment, a value of the compression type recognition bit of the (2×2) compression data is "110".

The form recognition data is 2-bit data that indicates which one of correlations between image data of two pixels of the pixels A to D is high. When the (2×2) pixel compression is employed, a correlation of image data between two pixels of the pixels A to D is high and a correlation of image data of remaining two pixels with the former two pixels is high. Accordingly, there are three combinations of two pixels having a high correlation of image data as follows;

the correlation of the pixels A and B is high and the correlation of the pixels C and D is high, the correlation of the pixels A and C is high and the correlation of the pixels B and D is high, and the correlation of the pixels A and D is high and the correlation of the pixels B and C is high.

The form recognition data indicates any one of these three combinations by 2 bits.

The R representative value #1, G representative value #1, and B representative value #1 are values representing gradation values of the R sub-pixel, G sub-pixel, and B sub-pixel of one of two pairs of the two pixels, respectively, and the R representative value #2, G representative value #2, and B representative value #2 are values representing gradation values of the R sub-pixel, G sub-pixel, and B sub-pixel of the other of the two pairs, respectively. In the example of FIG. 11A, the R representative value #1, the G representative value #1, the B representative value #1, the R representative value #2, and the B representative value #2 are 5-bit data or 6-bit data, and the G representative value #2 is 6-bit data or 7-bit data.

The β comparison data is data that indicates whether or not each of a difference between gradation values of the R sub-pixels of two pixels having a high correlation, a difference between image data of the G sub-pixels of the two pixels having the high correlation, and a difference between image data of the B sub-pixels of the two pixels is greater than the predetermined threshold value β. In the present embodiment, the β comparison data is 6-bit data where 3 bits are allocated to each of two pairs of two pixels. Meanwhile, the large-small recognition data is data that indicates: which one of the gradation values of the R sub-pixels of the two pixels having the high correlation is larger; and which one of the gradation values of the G sub-pixels of the two pixels is larger. The large-small recognition data corresponding to the R sub-pixel is generated only when the difference between gradation values of R sub-pixels of two pixels having a high correlation is larger than the threshold value β, the large-small recognition data corresponding to the G sub-pixel is generated only when the difference between gradation values of G sub-pixels of two pixels having the high correlation is larger than the threshold value β, and the large-small recognition data corresponding to the B sub-pixel is generated only when the difference between gradation values of B sub-pixels of two pixels having the high correlation is larger than the threshold value β. Accordingly, the large-small recognition data is 0 to 6-bit data.

Referring to FIG. 10A, the (2×2) pixel compression will be explained below. FIG. 10A describes generation of the (2×2) compressed data in a case where: a correlation between image data of the pixels A and B is high; and a correlation between image data of the pixels C and D is high. A person skilled in the art will easily understand that the (2×2) compressed data can be generated in the same manner also in other cases.

First of all, regarding each of the R sub-pixel, the G sub-pixel, and the B sub-pixel, an average value of gradation values is calculated. The average values Rave1, Gave1, and Bave1 of the gradation values of the Rsub-pixels, the G sub-pixels, and the B sub-pixels of the pixels A and B, and the average values Rave2, Gave2, and Bave2 of the gradation values of the R sub-pixels, the G sub-pixels, and the B sub-pixels of the pixels C and D are calculated by following expressions, $Rave1=(R_A+R_B+1)/2,$ $Gave1=(G_A+G_B+1)/2,$ $Bave1=(B_A+B_B+1)/2,$ $Rave2=(R_C+R_D+1)/2,$ $Gave2=(G_C+G_D+1)/2,$ $Bave2=(B_C+B_D+1)/2.$ In addition, comparison as to whether or not each of a difference $|R_A-R_B|$ of gradation values of R sub-pixels of the pixels A and B, a difference $|G_A-G_B|$ of gradation values of G sub-pixels, and a difference $|B_A-B_B|$ of gradation values of B sub-pixels is larger than the predetermined threshold value β. In the same manner, comparison as to whether or not each of a difference $|R_C-R_D|$ of gradation values of R sub-pixels of the pixels C and D, a difference $|G_C-G_D|$ of gradation values of G sub-pixels, and a difference $|B_C-B_D|$ of gradation values of B sub-pixels is larger than the predetermined threshold value β. These comparison results are described in the (2×2) compressed data as the β comparison data.

Moreover, the large-small recognition data related to each of a combination of the pixels A and B and to a combination of the pixels C and D are created.

Specifically, when the difference $|R_A-R_B|$ of gradation values of R sub-pixels of the pixels A and B is larger than the threshold value β, it is described to the large-small recognition data which one of gradation values of the R sub-pixels of the pixels A and B is larger. When the difference $|R_A-R_B|$ of gradation values of R sub-pixels of the pixels A and B is equal to or less than the threshold value β, the magnitude relation of the gradation values of the R sub-pixels of the pixels A and B is not described in the large-small recognition data. In the same manner, when the difference $|G_A-G_B|$ of gradation values of G sub-pixels of the pixels A and B is larger than the threshold value β, it is described to the large-small recognition data which one of gradation values of the G sub-pixels of the pixels A and B is larger. When the difference $|G_A-G_B|$ of gradation values of G sub-pixels of the pixels A and B is equal to or less than the threshold value β, the magnitude relation of the gradation values of the G sub-pixels of the pixels A and B is not described in the large-small recognition data. In addition, when the difference $|B_A-B_B|$ of gradation values of B sub-pixels of the pixels A and B is larger than the threshold value β, it is described to the large-small recognition data which one of gradation values of the B sub-pixels of the pixels A and B is larger. When the difference $|B_A-B_B|$ of gradation values of B sub-pixels of the pixels A and B is equal to or less than the threshold value β, the magnitude relation of the gradation values of the B sub-pixels of the pixels A and B is not described in the large-small recognition data.

Similarly, when the difference $|R_C-R_D|$ of gradation values of R sub-pixels of the pixels C and D is larger than the threshold value β, it is described to the large-small recognition data which one of gradation values of the R sub-pixels of the pixels C and D is larger. When the difference $|R_C-R_D|$ of gradation values of R sub-pixels of the pixels C and D is equal to or less than the threshold value β, the magnitude relation of the gradation values of the R sub-pixels of the pixels C and D is not described in the large-small recognition data. In the same manner, when the difference $|G_C-G_D|$ of gradation values of G sub-pixels of the pixels C and D is larger than the threshold value β, it is described to the large-small recognition data which one of gradation values of the G sub-pixels of the pixels C and D is larger. When the difference $|G_C-G_D|$ of gradation values of G sub-pixels of the pixels C and D is equal to or less than the threshold value β, the magnitude relation of the gradation values of the G sub-pixels of the pixels C and D is not described in the large-small recognition data. In addition, when the difference $|B_C-B_D|$ of gradation values of B sub-pixels of the pixels C and D is larger than the threshold value β, it is described to the large-small recognition data which one of gradation values of the B sub-pixels of the pixels C and D is larger. When the difference $|B_C-B_D|$ of gradation values of B sub-pixels of the pixels C and D is equal to or less than the threshold value β, the magnitude relation of the gradation values of the B sub-pixels of the pixels C and D is not described in the large-small recognition data.

In the example of FIG. 10A, the gradation values of the R sub-pixels of the pixels A and B are 50 and 59, respectively, and the threshold value β is 4. In this instance, since the difference $|R_A-R_B|$ of the gradation values is larger than the threshold value β, the result is described in the β comparison data, and it is described to the large-small recognition data that the gradation value of the R sub-pixel of the pixel B is larger than the gradation value of the R sub-pixel of the pixel A. Meanwhile, the gradation values of the G sub-pixels of the pixels A and B are 2 and 1, respectively. Since the difference $|G_A-G_B|$ of the gradation values is equal to or less the threshold value β, the result is described in the β comparison data. The magnitude relation of the gradation values of the G sub-pixels of the pixels A and B is not described in the large-small recognition data. In addition, the gradation values of the B sub-pixels of the pixels A and B are 30 and 39, respectively. In this instance, since the difference $|B_A-B_B|$ of the gradation values is larger than the threshold value β, the result is described in the β comparison data, and it is described to the large-small recognition data that the gradation value of the B sub-pixel of the pixel B is larger than the gradation value of the B sub-pixel of the pixel A.

In addition, both of the gradation values of the R sub-pixels of the pixels C and D are 100. In this instance, since the difference $|R_C-R_D|$ of the gradation values is equal to of less than the threshold value β, the result is described in the β comparison data. The magnitude relation of the gradation values of the G sub-pixels of the pixels A and B is not described in the large-small recognition data. Moreover, the gradation values of the G sub-pixels of the Pixels C and D are 80 and 85, respectively. In this instance, since the difference $|G_A-G_B|$ of the gradation values is larger than the threshold value β, the result is described in the β comparison data, and it is described to the large-small recognition data that the gradation value of the G sub-pixel of the pixel D is larger than the gradation value of the G sub-pixel of the pixel C. Furthermore, the gradation values of the B sub-pixels of the pixels C and D are 8 and 2, respectively. In this instance, since the difference $|B_C-B_D|$ of the gradation values is larger than the threshold value β, the result is described in the β comparison data, and it is described to the large-small recognition data that the gradation value of the B sub-pixel of the pixel C is larger than the gradation value of the B sub-pixel of the pixel D.

Moreover, the error data α is added to: the average values Rave1, Gave1, and Bave1 of the gradation values of the R sub-pixel, the G sub-pixel, and B sub-pixel of the pixels A and B; and the average values Rave2, Gave2, and Bave2 of the gradation values of the R sub-pixel, the G sub-pixel, and B sub-pixel of the pixels C and D. In the present embodiment, the error data α is determined on the basis of coordinates of the two pixels of each combination by using a basic matrix that is the Bayer-Matrix. The calculation of the error data α will be described below. Supposing that the error data α determined for the pixels A and B is "0", the present embodiment will be explained below.

Furthermore, a rounding process and a bit round-down process are performed, thereby the R representative value #1, the G representative value #1, the B representative value #1, the R representative value #2, the G representative value #2, and the B representative value #2 are calculated. At first, for explanation regarding the pixels A and B, a value added in the rounding process and the number of bits rounded down in the bit round-down process are determined to be 2 bits or 3 bits depending on the magnitude relation of the threshold value β with the differences $|R_A-R_B|$, $|G_A-G_B|$, and $|B_A-B_B|$ of the gradation values. As for the R sub-pixel, when the difference $|R_A-R_B|$ of the gradation values of R sub-pixels is larger than the threshold value β, a process to round lower 3 bits down after adding a value 4 to the average value Rave1 of the gradation values of the R sub-pixels is performed, thereby the R representative value #1 is calculated. When the difference $|R_A-R_B|$ is not larger than the threshold value β, a process to round lower 2 bits down after adding a value 2 to the average value Rave1 is performed, thereby the R representative value #1 is calculated. As a result, the R representative value #1 has 5 bits or 6 bits. This is much the same for the G sub-pixel and the B sub-pixel. When the difference $|G_A-G_B|$ of the gradation values is larger than the threshold value β, a process to round lower 3 bits down after adding a value 4 to the average value Gave1 of the gradation values of the G sub-pixels is performed, thereby the G representative value #1 is calculated. When the difference $|G_A-G_B|$ is not larger than the threshold value β, a process to round lower 2 bits down after adding a value 2 to the average value Gave1 is performed, thereby the G representative value #1 is calculated. In addition, when the difference $|B_A-B_B|$ of the gradation values is larger than the threshold value β, a process to round lower 3 bits down after adding a value 4 to the average value Bave1 of the gradation values of the B sub-pixels is performed, thereby the B representative value #1 is calculated. When the difference $|B_A-B_B|$ is not larger than the threshold value β, a process to round lower 2 bits down after adding a value 2 to the average value Bave1 is performed, thereby the B representative value #1 is calculated.

In the example of FIG. 10A, as for the average value Rave1 of the R sub-pixels of the pixels A and B, a process to round lower 3 bits down after adding a value 4 is performed, thereby the R representative value #1 is calculated. In addition, as for the average value Gave1 of the G sub-pixels of the pixels A and B, a process to round lower 2 bits down after adding a value 2 is performed, thereby the G representative value #1 is calculated. Moreover, as for the average value Bave1 of the B sub-pixels of the pixels A and B, a process to round lower 3 bits down after adding a value 4 is performed, thereby the B representative value #1 is calculated.

The same process is performed to the combination of the pixels C and D, thereby the R representative value #2, the G representative value #2, and the B representative value #2 are calculated. However, as for the G sub-pixels of the pixels C and D, a value added in the rounding process and the number of bits rounded down in the bit round-down process are 1 bit or 2 bits. When the difference $|G_C-G_D|$ of the gradation values is larger than the threshold value β, a process to round lower 2 bits down after adding a value 2 to the average value Gave2 of the gradation values of the G sub-pixels is performed, thereby the G representative value #2 is calculated. When the difference $|G_C-G_D|$ is not larger than the threshold value β, a process to round lower 1 bits down after adding a value 1 to the average value Gave2 is performed, thereby the G representative value #2 is calculated.

In the example of FIG. 10A, as for the average value Rave2 of the R sub-pixels of the pixels C and D, a process to round lower 2 bits down after adding a value 2 is performed, thereby the R representative value #2 is calculated. In addition, as for the average value Gave2 of the G sub-pixels of the pixels C and D, a process to round lower 3 bits down after adding a value 4 is performed, thereby the G representative value #2 is calculated. Moreover, as for the B sub-pixels of the pixels C and D, a process to round lower 3 bits down after adding a value 4 to the average value Bave 2 of the gradation values of the B sub-pixels is performed, thereby the B representative value #2 is calculated.

As described above, the compression process by the (2×2) pixel compression is completed.

Meanwhile, FIG. 10B is a view showing a decompression method of the compressed image data compressed in the (2×2) pixel compression. FIG. 10B describes decompression of the (2×2) compressed data in a case where: a correlation between image data of the pixels A and B is high; and a correlation between image data of the pixels C and D is high. A person skilled in the art will easily understand that the (2×2) compressed data can be decompressed in the same manner also in other cases.

First of all, a bit round-up process is performed to the R representative value #1, the G representative value #1, and the B representative value #1. The number of bits of the bit round-up process is determined depending on the magnitude relation of the threshold value β with the differences $|R_A-R_B|$, $|G_A-G_B|$, and $|B_A-B_B|$ of the gradation values, the magnitude relation being described in the β comparison data. When the difference $|R_A-R_B|$ of gradation values of R sub-pixels of the pixels A and B is larger than the threshold value β, the bit round-up process of 3 bits is performed on the R representative value #1, and when the difference $|R_A-R_B|$ is not larger than the threshold value β, the bit round-up process of 2 bits is performed. In the same manner, when the difference $|G_A-G_B|$ between gradation values of G sub-pixels of the pixels A and B is larger than the threshold value β, the bit round-up process of 3 bits is performed on the G representative value #1, and when the difference $|G_A-G_B|$ is not larger than the threshold value β, the bit round-up process of 2 bits is performed. In addition, when the difference $|B_A-B_B|$ between gradation values of B sub-pixels of the pixels A and B is larger than the threshold value β, the bit round-up process of 3 bits is performed on the B representative value #1, and when the difference $|B_A-B_B|$ is not larger than the threshold value β, the bit round-up process of 2 bits is performed. In the example of FIG. 10B, regarding the R representative value #1, the process to round 3 bits up is performed, regarding the G representative value #1, the process to round 2 bits up is performed, and regarding the B representative value #1, the process to round 3 bits up is performed.

The same bit round-up process is performed to the R representative value #2, the G representative value #2, and the B representative value #2. However, the number of bits of the bit round-up process for the G representative value #2 is selected from 1 bit or 2 bits. When the difference $|G_C-G_D|$ between gradation values of G sub-pixels of the pixels C and D is larger than the threshold value β, the bit round-up process of 2 bits is performed on the G representative value #2, and when the difference $|G_C-G_D|$ is not larger than the threshold value β, the bit round-up process of 1 bit is performed. In the example of FIG. 10B, regarding the R representative value #2, the process to round 2 bits up is performed, regarding the G representative value #2, the process to round 2 bits up is performed, and regarding the B representative value #2, the process to round 3 bits up is performed.

In addition, after subtracting the error data a from each of the R representative value #1, the G representative value #1, the B representative value #1, the R representative value #2, the G representative value #2, and the B representative value #2, a process to extract: the gradation values of the R sub-pixel, the G sub-pixel, and the B sub-pixel of the pixels A and B; and the gradation values of the R sub-pixel, the G sub-pixel, and the B sub-pixel of the pixels C and D from these representative values is performed.

In the extraction of the gradation values, the β comparison data and the large-small recognition data are used. When it is described in the β comparison data that the difference $|R_A-R_B|$ of the gradation values of the R sub-pixels of the pixels A and B are larger than the threshold value β, a value obtained by adding a constant value 5 to the R representative value #1 is extracted as the gradation value of the R sub-pixel of larger one of the pixels A and B described in the large-small recognition data, and a value obtained by subtracting the constant value 5 from the R representative value #1 is extracted as the gradation value of the R sub-pixel of the smaller one described in the large-small recognition data. When the difference $|R_A-R_B|$ of the gradation values of the R sub-pixels of the pixels A and B are smaller than the threshold value β, the gradation values of the R sub-pixels of the pixels A and B is extracted as being equal to the R representative value #1. In the same manner, the gradation values of the G sub-pixels and the B sub-pixels of the pixels A and B and the gradation values of the R sub-pixels, the G sub-pixels, and the B sub-pixels of the pixels C and D are extracted in the same procedure.

In the example of FIG. 10B, the gradation value of the R sub-pixel of the pixel A is extracted as a value obtained by subtracting only a value 5 from the R representative value #1, and the gradation value of the R sub-pixel of the pixel B is extracted as a value obtained by adding a value 5 to the R representative value #1. In addition, the gradation values of the G sub-pixels of the pixels A and B is extracted as being equal to the G representative value #1. Moreover, the gradation value of the B sub-pixel of the pixel A is extracted as a value obtained by subtracting only a value 5 from the B representative value #1, and the gradation value of the B sub-pixel of the pixel B is extracted as a value obtained by adding a value 5 to the B representative value #1. Meanwhile, the gradation values of the R sub-pixels of the pixels C and D is extracted as being equal to the R representative value #2. Furthermore, the gradation value of the G sub-pixel of the pixel C is extracted as a value obtained by subtracting only a value 5 from the G representative value #2, and the gradation value of the G sub-pixel of the pixel D is extracted as a value obtained by adding a value 5 to the G representative value #2. Additionally, the gradation value of the B sub-pixel of the pixel C is extracted as a value obtained by adding a value 5 to the B representative value #2, and the gradation value of the B sub-pixel of the pixel D is extracted as a value obtained by subtracting a value 5 from the B representative value #2.

As described above, the extraction of the gradation values of the R sub-pixels, the G sub-pixels, and the B sub-pixels of the pixels A to D is completed. Comparing image data of pixels A to D in a rightmost table of FIG. 10B with image data of pixels A to D in leftmost tables of FIG. 10A, it can be understood that original image data of pixels A to D are almost extracted by the above-mentioned decompression method.

As a modified example of the compression method and decompression method of FIGS. 10A and 10B, while 2 bits are provided to the form recognition data, the number of combinations of two pixels having a high correlation of image data is three, and regarding a certain combination of the pixels, the number of bits provided to its representative value can be accordingly increased. For example, the form recognition data is defined as follows (x is any value of "0" and "1");

a correlation between pixels A and B is high and a correlation between pixels C and D is high: 0x, a correlation between pixels A and C is high and a correlation between pixels B and D is high: 10, a correlation between pixels A and D is high and a correlation between pixels B and C is high: 11.

In the instance, only when the correlation between image data of the pixels A and B is high and the correlation between image data of the pixels C and D is high, the number of bits provided to the form recognition data is set to be 1 bits, and additionally the number of bits provided to any one of the R representative value #1, the G representative value #1, the B representative value #1, the R representative value #2, and the B representative value #2 can be increased by 1 bit. To improve symmetry of data of: combination of the pixels A and B; and combination of the pixels C and D, it is favorable to increase the number of bits provided to the G representative value #1 by 1 bit.

FIG. 11B is a view showing a format of the (2×2) compression data of a case where the number of bits provided to the G representative value #1 is increased by 1 bit when correlation between image data of the pixels A and B is high and correlation between image data of the pixels C and D is high. In the format of FIG. 11B, 1 bit is provided to the form recognition data, and 6 bits or 7 bits are provided to the G representative value #1 depending on the magnitude relation between the difference $|G_A-G_B|$ of the gradation values and the threshold value β. By increasing the number of bits provided to the G representative value #1, information amount is increased, thereby a compression distortion can be reduced. In this instance, a round-up process of 1 bit or 2 bits is performed to the G representative value #1 in the decompression process. The number of bits of the round-up process is determined depending on the magnitude relation between the difference $|G_A-G_B|$ of the gradation values and the threshold value β.

3-4. (4×1) Pixel Compression

FIG. 12A is a conceptual view to explain the (4×1) pixel compression, and FIG. 13 is a conceptual view showing a format of data of the (4×1) pixel compression. As described above, the (4×1) pixel compression is a compression method used when there is a high correlation of image data of four pixels of a target block. As shown in FIG. 13, in the present embodiment, the (4×1) compression data is 48-bit data, and includes: a compression type recognition bit; and the following seven data, Ymin, Ydist0 to Ydist2, address data, Cb', and Cr'.

The compression type recognition bit is data that indicates a type of compression method used for a compression, and 4 bits are allocated to the compression type recognition bit in the (4×1) compressed data. In the present embodiment, a value of the compression type recognition bit of the (4×1) compressed data is "1110".

The Ymin, Ydist0 to Ydist2, address data, Cb', and Cr' are data obtained by: converting image data of four pixels of a target block from RGB data into YUV data; and further performing a compression process on the YUV data. Here, the Ymin and Ydist0 to Ydist2 are data obtained from brightness data among the YUV data of four pixels of the target block, and the Cb' and Cr' are data obtained from color-difference data. The Ymin, Ydist0 to Ydist2, Cb', and Cr' are representative values of image data of four pixels of the target block. In the present embodiment, 10 bits are allocated to the data Ymin, 4 bits are allocated to each of the Ydist0 to Ydist2, 2 bits are allocated to the address data, and 10 bits are allocated to each of the Cb' and Cr'. Referring to FIG. 12A, the (4×1) pixel compression will be explained below.

At first, regarding each of the pixels A to D, the brightness data Y and the color-difference data Cr and Cb are calculated by the following matrix operation;

$$\begin{bmatrix} Y_k \\ Cr_k \\ Cb_k \end{bmatrix} = \begin{bmatrix} 1 & 2 & 1 \\ 0 & -1 & 1 \\ 1 & -1 & 0 \end{bmatrix} \begin{bmatrix} R_k \\ G_k \\ B_k \end{bmatrix},$$ [Expression 1]

Here, the $Y_k$ is brightness data of a pixel k, the $Cr_k$ and $Cb_k$ are color-difference data of the pixel k. In addition, as described above, $R_k$, $G_k$, and $B_k$ are the gradation values of the R sub-pixel, the G sub-pixel, and the B sub-pixel, respectively.

In addition, the Ymin, Ydist0 to Ydist2, address data, Cb', and Cr' are created from the brightness data $Y_k$ of the pixels A to D and the color-difference data $Cr_k$ and $Cb_k$.

The Ymin is defined as a minimum data (minimum brightness data) of the brightness data $Y_A$ to $Y_D$. In addition, the Ydist0 to Ydist2 are generated by performing a round-down process of 2 bits on differences between the remaining brightness data and the minimum brightness data Ymin. The address data is generated as data for indicating which one of the brightness data of the pixels A to D is the minimum. In the example of FIG. 12A, the Ymin, and the Ydist0 to Ydist2 are calculated by the following expressions;

Ymin=$Y_D$=4,

Ydist0=($Y_A$−Ymin)>>2=(48−4)>>2=11,

Ydist1=($Y_B$−Ymin)>>2=(28−4)>>2=6,

Ydist2=($Y_C$−Ymin)>>2=(16−4)>>2=3,

Where the ">>2" is an operator representing a round-down process of 2 bits. It is described to the address data that the brightness data $Y_D$ is the minimum.

Moreover, the Cr' is generated by performing a round-down process of 1 bit on a summation of $Cr_A$ to $Cr_D$, and the Cb' is similarly generated by performing the round-down process of 1 bit on a summation of $Cb_A$ to $Cb_D$. In the example of FIG. 12A, the Cr' and Cb' are calculated by the following expressions;

$$Cr' = (Cr_A + Cr_B + Cr_C + Cr_D) >> 1$$
$$= (-2 - 1 + 1 - 1) >> 1 = -1,$$

and $$Cb' = (Cb_A + Cb_B + Cb_C + Cb_D) >> 1$$
$$= (2 + 1 - 1 + 1) >> 1 = 1,$$

Where the ">>1" is an operator representing a round-down process of 1 bit. In the above-described manner, the generation of the (4×1) compressed data is completed.

Figure 12B:
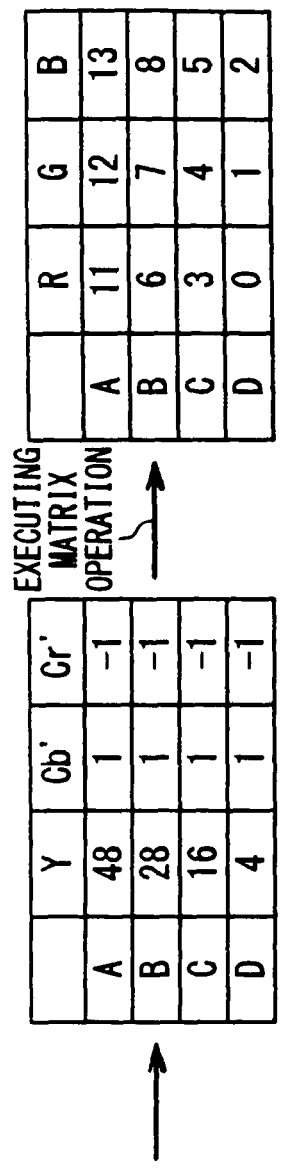
FIG. 12B is a conceptual view to explain a decompression method for compressed image data compressed by the (4×1) image compression.

Meanwhile, FIG. 12B is a view showing a decompression method of compressed image data compressed by the (4×1) pixel compression. In the decompression of compressed image data compressed by the (4×1) pixel compression, the brightness data of each of the pixels A to D are firstly extracted from the Ymin, and the Ydist0 to Ydist2. The extracted brightness data of the pixels A to D are described as $Y_A'$ to $Y_D'$ below. More specifically, a value of the minimum brightness data Ymin is used as the brightness data of pixel indicated as the minimum data by the address data. In addition, by adding the Ydist0 to Ydist2 to the minimum brightness data Ymin after performing a round-up process of 2 bits on them, the brightness data of other pixels are extracted. In the present embodiment, the brightness data $Y_A'$ to $Y_D'$ are extracted by the following expressions;

$Y_A'$=Ydist0×4+Ymin=44+4=48, $Y_B'$=Ydist1×4+Ymin=24+4=28, $Y_C'$=Ydist2×4+Ymin=12+4=16, and $Y_D'$=Ymin=4.

Moreover, the gradation values of the R, G, B sub-pixels of the pixels A to D are extracted from the brightness data $Y_A'$ to $Y_D'$ and the color-difference data Cr' and Cb' by the following matrix operation;

$$\begin{bmatrix} R_k \\ G_k \\ B_k \end{bmatrix} = \begin{bmatrix} 1 & -1 & 3 \\ 1 & -1 & -1 \\ 1 & 3 & -1 \end{bmatrix} \begin{bmatrix} Y_k' \\ Cr' \\ Cb' \end{bmatrix} >> 2,$$ [Expression 2]

Where the "1>>2" is the operator indicating the round-down process of 2 bits. As understood from the above-mentioned expression, in the extraction of the gradation values of the R, G, and B sub-pixels of the pixels A to D, the color-difference data Cr' and Cb' are commonly used.

In the above-described manner, the decompression of the gradation values of the R sub-pixels, G sub-pixels, and B sub-pixels of the pixels A to D is completed. Comparing image data of pixels A to D in a rightmost table of FIG. 12B with image data of pixels A to D in a leftmost table of FIG. 12A, it can be understood that the original image data of pixels A to D are almost extracted by the above-mentioned decompression method.

3-5. Calculation of Error Data α

Calculation of the error data α used in the (1×4) pixel compression, the (2+1×2) pixel compression, and the (2×2) pixel compression will be explained below.

The error data α used for the bit plane reduction process performed to each pixels, the bit plane reduction process being performed in the (1×4) pixel compression and the (2+1×2) pixel compression, is calculated from the basic matrix shown in FIG. 14 and coordinates of each pixels. Here, the basic matrix is a matrix where a relation between: lower 2 bits, X1 and X0 of an X coordinate of pixel and lower 2 bits, Y1 and Y0 of a Y coordinate; and a basic value Q of the error data α. The basic value Q is a value used as a seed for calculation of the error data α.

Specifically, the basic value Q is firstly extracted from among matrix elements of the basic matrix on the basis of lower 2 bits, X1 and X0 of an X coordinate and lower 2 bits, Y1 and Y0 of a Y coordinate of a target pixel. For example, when a target of the bit plane reduction process is the pixel A and the lower 2 bits of coordinates of the pixel A is "00", "15" is extracted as the basic value Q.

In addition, the following operation is performed to the basic value Q based on the number of bits of the bit round-down process subsequently performed in the bit plane reduction process, thereby the error data α is calculated;

α=Q×2: (the number of bits in the bit round-down process is 5),

α=Q: (the number of bits in the bit round-down process is 4), and

α=Q/2: (the number of bits in the bit round-down process is 3).

Meanwhile, the error data α used for a calculation process of representative values of image data of two pixels having a high correlation in the (2+1×2) pixel compression and the (2×2) pixel compression is calculated from: the basic matrix shown in FIG. 14; and lower 2 bits X1 and Y1 of the X coordinate and the Y coordinate of the target two pixels. Specifically, any one of the pixels if the target block is determined as a pixel used to extract the basic value Q. The pixel used to extract the basic value Q is described as a Q extraction pixel below. A relation between: a combination of target two pixels; and the Q extraction pixel is as follows.

In a case where the target two pixels are Pixels A and B, the Q extraction pixel is the pixel A.

In a case where the target two pixels are Pixels A and C, the Q extraction pixel is the pixel A.

In a case where the target two pixels are Pixels A and D, the Q extraction pixel is the pixel A.

In a case where the target two pixels are Pixels B and C, the Q extraction pixel is the pixel B.

In a case where the target two pixels are Pixels B and D, the Q extraction pixel is the pixel B.

In a case where the target two pixels are Pixels C and D, the Q extraction pixel is the pixel B.

In addition, the basic value Q corresponding to the Q extraction pixel is extracted from the basic matrix based on X1 and Y1 at lower 2nd bits of the X coordinate and Y coordinate of the target two pixels. For example, when the target two pixels are the pixels A and B, the Q extraction pixel is the pixel A. In this instance, the basic value Q to be used is finally determined based on the X1 and Y1 from among four basic values Q related to the pixel A of the Q extraction pixel in the basic matrix as follows;

Q=15 (X1=Y1="0"),
Q=01 (X1="1", Y1="0")
Q=07 (X1="0", Y1="1"), and
Q=13 (X1=Y1="11").

Moreover, the following operations are performed on the basic value Q based on the number of bits of the bit round-down process subsequently performed in the calculation of the representative value, thereby the error data α used for a calculation process of a representative value of image data of two pixels having a high correlation is calculated;

α=Q/2: (the number of bits of the bit round-down process is 3),

α=Q/4: (the number of bits of the bit round-down process is 2), and

α=Q/8: (the number of bits of the bit round-down process is 1).

For example, when the target two pixels are the pixels A and B, X1=Y1="1", and the number of bits of the bit round-down process is 3, the error data α is determined by a following expression;

Q=13, and

α=13/2=6.

Additionally, the calculation method of the error data α is not limited to the above-mentioned method. For example, another matrix that is the Bayer-Matrix may be used as the basic matrix.

3-6. Compression Type Recognition Bit

One of matters to be noted in the compression method explained above is allocation of the number of bits of the compression type recognition bit in each compressed image data. In the present embodiment, the number of bits of the compressed image data is fixed to 48 bits, however, the compression type recognition bit is variable from 1 to 4 bits. Specifically, in the present embodiment, the compression type recognition bits of the (1×4) pixel compression, the (2+1×2) pixel compression, the (2×2) pixel compression, and the (4×1) pixel compression are as follows;

(1×4) pixel compression: "0" (1 bit),
(2+1×2) pixel compression: "10" (2 bits),
(2×2) pixel compression: "110" (3 bits), and
(4×1) pixel compression: "1110" (4 bits).

It should be noted that the lower a correlation between image data of pixels of the target block is, the smaller the number of bits allocated to the compression type recognition bit is, and the higher a correlation between image data of pixels of the target block is, the larger the number of bits allocated to the compression type recognition bit is.

To fix the number of bits of the compressed image data regardless of the compression method is effective way to simplify sequences of: writing of compressed image data to the image memory 14; and reading the compressed image data from the image memory 14.

Meanwhile, in order to reduce a compression distortion as a whole, it is effective that the lower a correlation between image data of pixels of the target block is, the smaller the number of bits allocated to the compression type recognition bit is (that is, the number of bits allocated to image data is large). In a case where a correlation between image data of pixels of a target block is high, the image data can be compressed with suppressing deterioration of image even when the number of bits allocated to the image data is small. On the other hand, in a case where a correlation between image data of pixels of a target block is low, the number of bits allocated to the image data is increased, thereby the compression distortion is reduced.

Second Embodiment

FIG. 15 is a block diagram showing a configuration of a liquid crystal display device according to a second embodiment of the present invention. The configuration of the liquid crystal display device according to the second embodiment is almost the same as the configuration of the liquid crystal display device of the first embodiment. However, the liquid crystal display device in the second embodiment is configured so as to perform the lossless compression when image data of a target block has a specific pattern. This is for enabling an appropriate inspection of the LCD panel 2. In the inspection of the LCD panel 2, evaluations of the brightness characteristic and the color gamut characteristic are carried out in the inspection of the LCD panel 2. In these evaluations of the brightness characteristic and the color gamut characteristic, an image of a specific pattern is displayed on the LCD panel 2. At this time, to appropriately evaluate the brightness characteristic and the color gamut characteristic, it is required to display an image where colors are faithfully reproduced with respect to inputted image data on the LCD panel 2; if a compression distortion exists, the evaluations of the brightness characteristic and the color gamut characteristic cannot be appropriately carried out. Accordingly, a circuit for carry out the lossless compression is added to the liquid crystal display device of the second embodiment.

Specifically, a lossless compression portion 36 is added to the image compression circuit 13, and an original data extraction portion 46 is added to the image decompression circuit 15. When image data of pixels of a target block has a specific form, the lossless compression portion 36 compresses the image data in a lossless manner and generates lossless compressed data. The original data extraction portion 46 decompresses the lossless compresses data in a decompression method accepting a lossless compression performed by the lossless compression portion 36.

FIG. 16 is a flowchart to explain an operation of the liquid crystal display device in the second embodiment. In the second embodiment, it is judged whether image data of four pixels of a target block corresponds to the specific pattern or not before evaluating a correlation of the image data of the pixels of the target block, and when the image data corresponds to the specific pattern, the lossless compression is carried out. In the present embodiment, a predetermined pattern where the number of types of data values of image data of a target block is five or less is selected as a specific pattern to which the loss less compression is performed.

Specifically, in the second embodiment, the lossless compression is carried out when image data of four pixels of a target block corresponds to any one of the following four patterns (1) to (4);
(1) Gradation Values of Each Color of Four Pixels are the Same (FIG. 17A)
Condition (1a):
  $R_A=R_B=R_C=R_D$,
  $G_A=G_B=G_C=G_D$, and
  $B_A=B_B=B_C=B_D$.

In this case, the number of types of data values of the image data of the four pixels of the target block is 3.
(2) Gradation Values of R Sub-Pixel, G Sub-Pixel, and B Sub-Pixel are the Same in Each of Four Pixels (FIG. 17B)

The lossless compression is carried out also in a case where the image data of the four pixels of the target block satisfies the following condition (2a).
  Condition (2a):
  $R_A=G_A=B_A$,
  $R_B=G_B=B_B$,
  $R_C=G_C=B_C$, and
  $R_D=G_D=B_D$.

In this case, the number of types of data values of the image data of the four pixels of the target block is 4.
(3) Gradation Values of Two Colors of R, G, and B are the Same Regarding Four Pixels of Target Block (FIG. 17c to FIG. 17E)

The lossless compression is carried out also in a case where any one of the following three conditions (3a) to (3c) is satisfied.
Condition (3a): $G_A=G_B=G_C=G_D=B_A=B_B=B_C=B_D$.
Condition (3b): $B_A=B_B=B_C=B_D=R_A=R_B=R_C=R_D$.
Condition (3c): $R_A=R_B=R_C=R_D=G_A=G_B=G_C=G_D$ In this case, the number of types of data values of the image data of the four pixels of the target block is 5.
(4) Gradation Values of One Color of R, G, and B are the Same, and Gradation Values of Remaining Two Colors are the Same Regarding Four Pixels of Target Block (FIG. 17f to FIG. 17H)

The lossless compression is further carried out also in a case where any one of the following three conditions (4a) to (4c) is satisfied.
Condition (4a):
  $G_A=G_B=G_C=G_D$
  $R_A=B_A$,
  $R_B=B_B$,
  $R_C=B_C$, and
  $R_D=B_D$.
Condition (4b):
  $B_A=B_B=B_C=B_D$
  $R_A=G_A$,
  $R_B=G_B$,
  $R_C=G_C$, and
  $R_D=G_D$.
Condition (4c):
  $R_A=R_B=R_C=R_D$
  $G_A=B_A$,
  $G_B=B_B$,
  $G_C=B_C$, and
  $G_D=B_D$.

In this case, the number of types of data values of the image data of the four pixels of the target block is 5.

Regarding the predetermined pattern, the number of kinds of the image data of the N×M pixels is less than (N×M×3/2). The reason is as follows. When the image data of the N×M pixels, the number of the data is (N×M×3) in consideration of R, G and B sub-pixels, is supplied and the data of each sub-pixel has k bits, the total number of bits is (N×M×3×k). If this total number of bits is required to be half, (N×M×3×k)/2 bits is required to be reduced. The number of bits of compressed data indicates the sum of the number of bits of the compressed image data and the number of bits of the compression type recognition bit. Therefore, if the sum of the number of bits of the compressed image data and the number of bits of the compression type recognition bit is equal to or less than (N×M×3×k)/2 bits, the image data can be compressed to be half. In this case, since the number of bits of the compression type recognition bit is not 0 (zero), the number of bits of the compressed image data is less than (N×M×3×k)/2 bits. Here, the image data has k bits, and the compressed imaged data can indicate the number of kinds of the image data×k bits, thus, the number of kinds of the image data is less than (N×M×3)/2. Therefore, if the image data is data that the number of kinds of the image data of the N×M pixels is less than (N×M×3/2), the image data can be compressed to be half.

In the present embodiment, the lossless compression is performed by rearranging data values of image data of pixels of a target block. FIG. 18 is a view showing a format of lossless compressed data generated by a lossless compression. In the present embodiment, the lossless compressed data is 48-bit data, and includes a compression type recognition bit, color type data, image data #1 to #5, and padding data.

The compression type recognition bit is data indicating a type of a compression method used for a compression, and four bits are allocated for the compression type recognition bit in the lossless compressed data. In the present embodiment, a value of the compression type recognition bit of the lossless compression data is "1111".

The color type data is data indicating which one of the patterns of FIGS. 17A to 17H corresponds to image data of four pixels of a target block. In the present embodiment, since eight specific patters are defined, the color type data has 3 bits.

The image data #1 to #5 are data obtained by rearranging data values of the image data of pixels of the target block. Each of the image data #1 to #5 is 8-bit data. As described above, since the number of types of data values of the image data of four pixels of the target block is five or less, the data value can be stored in all of the image data #1 to #5.

The padding data is data that is added to set the number of bits of the lossless compressed data to be the same as that of compressed image data compressed by other compression methods. In the present embodiment, the padding data has 1 bit.

The decompression of the lossless compressed data generated by the above-mentioned lossless compression is carried out by arranging the image data #1 to #5 with referring to the color type data. Since it is described to the color type data which one of the patterns of FIGS. 17A to 17H corresponds to the image data of four pixels of the target data, an original image data of four pixels of the target data can be completely extracted without generating any compression distortion by referring to the color type data. By driving the LCD panel 2 based on the completely extracted image data, the brightness characteristic and the color gamut characteristic of the LCD panel 2 can be appropriately evaluated.

Various types of embodiments of the present invention is described in the above description, however, the present invention should not be interpreted within the limitation of the above-described embodiments. For example, the liquid crystal display device having a LCD panel is proposed in the above-mentioned embodiment, however, it is obvious for a person skilled in the art that the present invention can be applied to other display panels.

Additionally, in the above-mentioned embodiments, the target block is defined as pixels in 2 rows by 2 columns, however, the target block can be generally defined as pixels in N rows by M columns (N and M are natural numbers, and N×M≧4). For example, the target block can be defined as pixels in 1 row by 4 columns. In this case, the rearrangement of image data using the line memory 12 is not carried out, and the line memory 12 is accordingly not required. Since a size of a hardware configuration can be reduced, it is preferable that the line memory 12 is not required.

It is apparent that the present invention is not limited to the above embodiment, but may be modified and changed without departing from the scope and spirit of the invention.

Although the present invention has been described above in connection with several exemplary embodiments thereof, it would be apparent to those skilled in the art that those exemplary embodiments are provided solely for illustrating the present invention, and should not be relied upon to construe the appended claims in a limiting sense.

What is claimed is:

1. A display panel driver, comprising:
    a compression circuit configured to, when receiving image data of four pixels which are arrayed in two rows and two columns or in one row and four columns to constitute a target block, generate compressed image data corresponding to said target block by compressing said image data;
    an image memory configured to store said compressed image data;
    a decompression circuit configured to generate decompressed image data by decompressing said compressed image data reading from said image memory; and
    a drive circuit configured to drive a display panel in response to said decompressed image data,
    wherein said compression circuit includes:
        a plurality of pixel compression portions; and
        a form recognition portion,
    wherein said plurality of pixel compression portions include:
        a first pixel compression portion which calculates a first representative value corresponding to image data of said four pixels and puts said first representative value in said compressed image data,
        a second pixel compression portion which calculates a second representative value corresponding to image data of two pixels of said four pixels and puts said second representative value in said compressed image data,
        a third pixel compression portion which calculates a first bit plane reduced data by performing a bit plane reduction process independently on image data of each of said four pixels and puts said first bit plane reduced data in said compressed image data, and
    wherein said form recognition portion selects one of said plurality of pixel compression portions based on correlations among said image data determined for all possible combinations of two pixels selected from said four pixels of said target block.

2. The display panel driver according to claim 1, wherein the number of bits of said compressed image data is constant regardless of selection of said plurality of pixel compression portions,
    wherein said compressed image data include at least one compression type recognition bit indicating said selected pixel compression portion,
    wherein the number of bit(s) of said at least one compression type recognition bit of said compressed image data compressed by said third pixel compression portion is equal to or less than the number of bit(s) of said at least one compression type recognition bit of said compressed image data compressed by said second pixel compression portion, and
    wherein the number of bit(s) of said at least one compression type recognition bit of said compressed image data compressed by said second pixel compression portion is equal to or less than the number of bit(s) of said at least one compression type recognition bit of said compressed image data compressed by said first pixel compression portion.

3. The display panel driver according to claim 1, wherein said plurality of pixel compression portions further include:
    a lossless compression portion which puts losslessly-compressed image data into said compressed image data, the losslessly-compressed image data being generated by losslessly compressing said image data of said four pixels,
    wherein said form recognition portion selects said lossless compression portion when said image data of said four pixels of said target block correspond to a predetermined pattern.

4. The display panel driver according to claim 1,
    wherein said second pixel compression portion calculates said second representative value corresponding to image data of two pixels of said four pixels of said target block and a third representative value corresponding to image data of the other two pixels of said four pixels of said target block, and puts said second representative value and said third representative value in said compressed image data.

5. The display panel driver according to claim 4, wherein said plurality of pixel compression portions further include:
    a fourth pixel compression portion which calculates a fourth representative value corresponding to image data of two pixels of said four pixels of said target block, calculates a second bit plane reduced data by performing a bit plane reduction process independently on image data of the other two pixels of said four pixels of said target block, and puts said fourth representative value and said second bit plane reducing data in said compressed image data.

6. The display panel driver according to claim 5, wherein the number of bits of said compressed image data is constant regardless of selection of said plurality of pixel compression portions,
  wherein said compressed image data include at least one a compression type recognition bit indicating said selected pixel compression portion,
  wherein the number of bit(s) of said at least one compression type recognition bit of said compressed image data compressed by said third pixel compression portion is equal to or less than the number of bit(s) of said at least one compression type recognition bit of said compressed image data compressed by said fourth pixel compression portion,
  wherein the number of bit(s) of said at least one compression type recognition bit of said compressed image data compressed by said fourth pixel compression portion is equal to or less than the number of bit(s) of said at least one compression type recognition bit of said compressed image data compressed by said second pixel compression portion, and
  wherein the number of bit(s) of said at least one compression type recognition bit of said compressed image data compressed by said fourth pixel compression portion is equal to or less than the number of bit(s) of said at least one compression type recognition bit of said compressed image data compressed by said third pixel compression portion.

7. The display panel driver according to claim 6, wherein said form recognition portion calculates a difference between image data of any two pixels of said four pixels of said target block, and
  (1) selects said third pixel compression portion, when said difference between image data of said two pixels is larger than a predetermined value in all combinations of said any two pixels,
  (2) selects said fourth pixel compression portion, when said third pixel compression portion is not selected, and when, with respect to all combinations of a first set having two pixels of said four pixels and a second set having the other two pixels of said four pixels, a difference between image data of said two pixels in said first set is not smaller than a predetermined value and a difference between image data of said the other two pixels in said second set is not smaller than a predetermined value,
  (3) selects said second pixel compression portion, when said third pixel compression portion and said fourth pixel compression portion are not selected, and when, with respect to all colors of said four pixels, a difference between a maximum value of image data of said four pixels and minimum value of image data of said four pixels is not smaller than a predetermined value, and
  (4) selects said first pixel compression portion, when said third pixel compression portion and said fourth pixel compression portion are not selected, and when, with respect to all colors of said four pixels, a difference between a maximum value of image data of said four pixels and minimum value of image data of said four pixels is smaller than a predetermined value.

8. The display panel driver according to claim 1, wherein the number of bits of said compressed image data corresponding to said target block is a half of the number of bits of said image data before being compressed corresponding to said target block.

9. A display device comprising:
  a display panel; and
  a display panel driver configured to drive said display panel,
  wherein said display panel driver includes:
    a compression circuit configured to, when receiving image data of four pixels which are arrayed in two rows and two columns or in one row and four columns to constitute a target block, generate compressed image data corresponding to said target block by compressing said image data;
    an image memory configured to store said compressed image data;
    a decompression circuit configured to generate decompressed image data by decompressing said compressed image data reading from said image memory; and
    a drive circuit configured to drive a display panel in response to said decompressed image data,
  wherein said compression circuit includes:
    a plurality of pixel compression portions; and
    a form recognition portion,
  wherein said plurality of pixel compression portions include:
    a first pixel compression portion which calculates a first representative value corresponding to image data of said four pixels and puts said first representative value in said compressed image data,
    a second pixel compression portion which calculates a second representative value corresponding to image data of two of said four pixels and puts said second representative value in said compressed image data,
    a third pixel compression portion which calculates a first bit plane reduced data by performing a bit plane reduction process independently on image data of each of said four pixels and puts said first bit plane reduced data in said compressed image data, and
  wherein said form recognition portion selects one of said plurality of pixel compression portions based on correlations among said image data determined for all possible combinations of two pixels selected from said four pixels of said target block.

10. The display device according to claim 9, wherein the number of bits of said compressed image data is constant regardless of selection of said plurality of pixel compression portions,
  wherein said compressed image data include at least one a compression type recognition bit indicating said selected pixel compression portion,
  wherein the number of bit(s) of said at least one compression type recognition bit of said compressed image data compressed by said third pixel compression portion is equal to or less than the number of bit(s) of said at least one compression type recognition bit of said compressed image data compressed by said second pixel compression portion, and
  wherein the number of bit(s) of said at least one compression type recognition bit of said compressed image data compressed by said second pixel compression portion is equal to or less than the number of bit(s) of said at least one compression type recognition bit of said compressed image data compressed by said first pixel compression portion.

11. The display device according to claim 9, wherein said plurality of pixel compression portions further include:

a lossless compression portion which puts losslessly-compressed image data into said compressed image data, the losslessly-compressed image data being generated by losslessly compressing said image data of said four pixels, wherein said form recognition portion selects said lossless compression portion, when said image data of said four pixels of said target block correspond to a predetermined pattern.

12. An image processing circuit comprising:

a compression circuit configured to, when receiving image data of four pixels which are arrayed in two rows and two columns or in one row and four columns to constitute a target block, generate compressed image data corresponding to said target block by compressing said image data, wherein said compression circuit includes:
- a plurality of pixel compression portions; and
- a form recognition portion wherein said plurality of pixel compression portions include:

a first pixel compression portion method which calculates a first representative value corresponding to image data of said four pixels and puts said first representative value in said compressed image data, a second pixel compression portion which calculates a second representative value corresponding to image data of two pixels of said four pixels and puts said second representative value in said compressed image data, a third pixel compression portion which calculates a first bit plane reduced data by performing a bit plane reduction process independently on image data of each of said four pixels and puts said first bit plane reduced data in said compressed image data, and wherein said form recognition portion selects one of said plurality of pixel compression portions based on correlations among said image data determined for all possible combinations of two pixels selected from said four pixels of said target block.

* * * * *